United States Patent [19]

Manabe et al.

[11] 4,288,851

[45] Sep. 8, 1981

[54] METHOD OF DETERMINING POSITION OF OPENINGS ADAPTED TO RECEIVE FRET SAW BLADE OF NUMERICALLY CONTROLLED FRET SAW MACHINES

[75] Inventors: Takao Manabe, Shizuoka; Hitoshi Ebata, Mishima; Shouichi Shin, Shizuoka, all of Japan

[73] Assignee: Toshiba Kikai Kabushiki Kaisha, Tokyo, Japan

[21] Appl. No.: 81,553

[22] Filed: Oct. 3, 1979

[51] Int. Cl.³ .................... G06F 15/46; G05B 19/18; B27B 19/00

[52] U.S. Cl. .................................. 364/475; 29/26 A; 29/558; 83/56; 144/35 R; 364/107

[58] Field of Search .............. 364/107, 475; 29/26 A, 29/558; 83/925 CC, 56; 76/107 C; 408/30; 144/35

*Primary Examiner*—Felix D. Gruber
*Attorney, Agent, or Firm*—Koda and Androlia

[57] ABSTRACT

In a machine for cutting grooves of a given pattern through a blank with a fret saw blade, openings for receiving the fret saw blade at the cutting starting points of the grooves are determined such that the center of each opening is positioned at a point spaced from a cutting start point by a distance equal to one half of the width of the fret saw blade in a direction opposite to the direction of cutting the groove.

6 Claims, 37 Drawing Figures

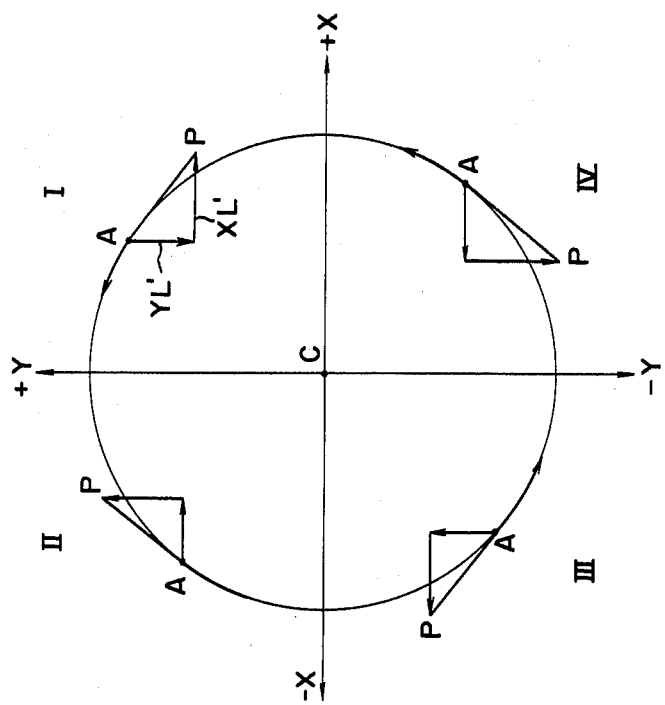
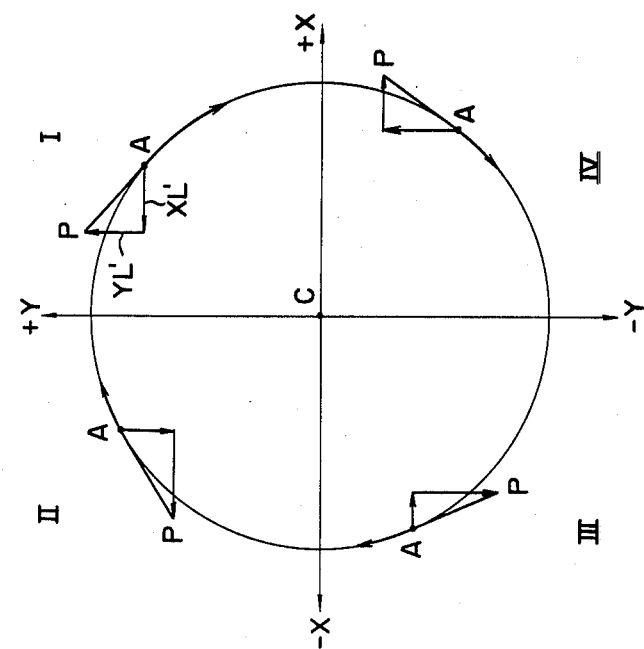
FIG. 22c

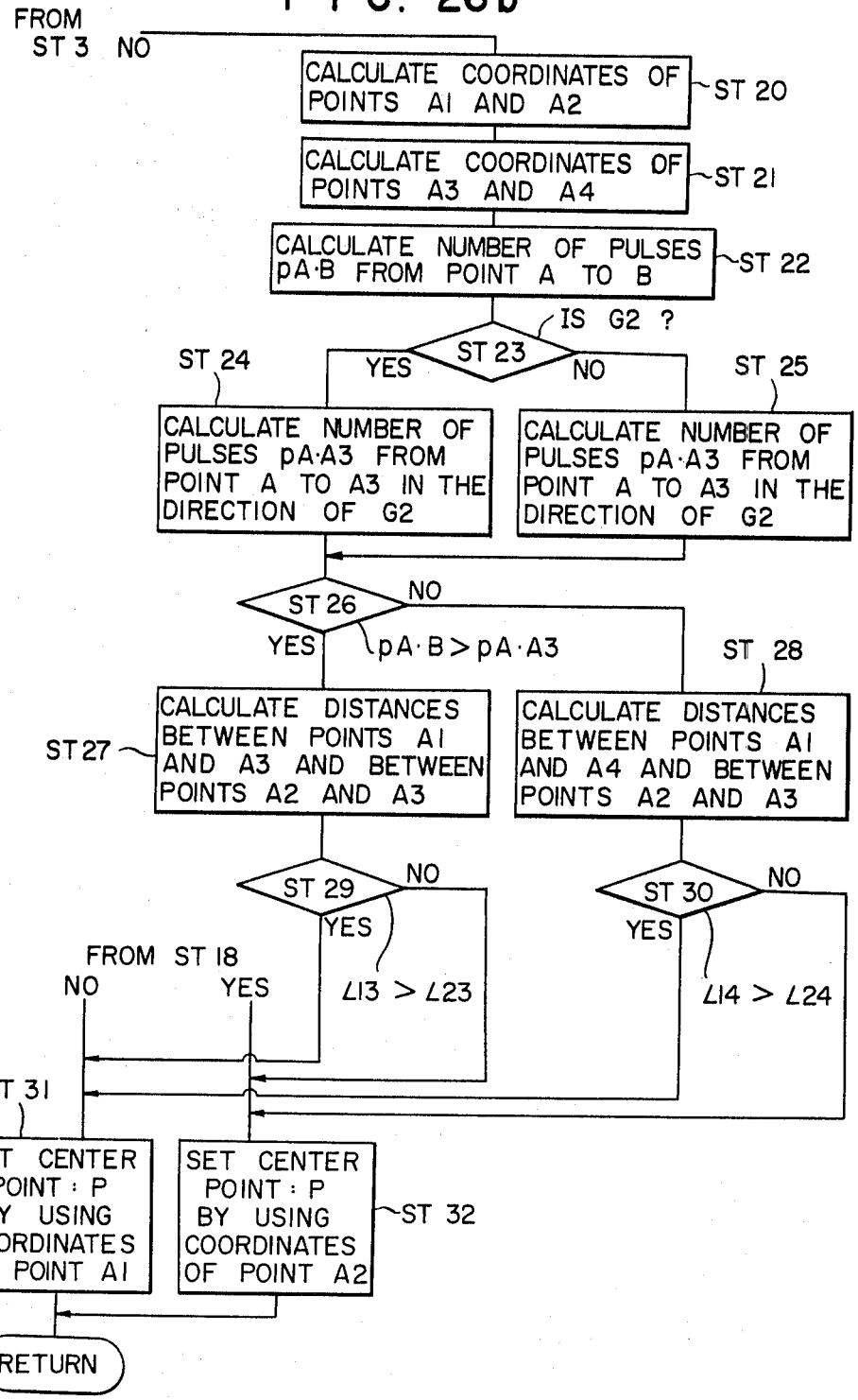

F I G. 27
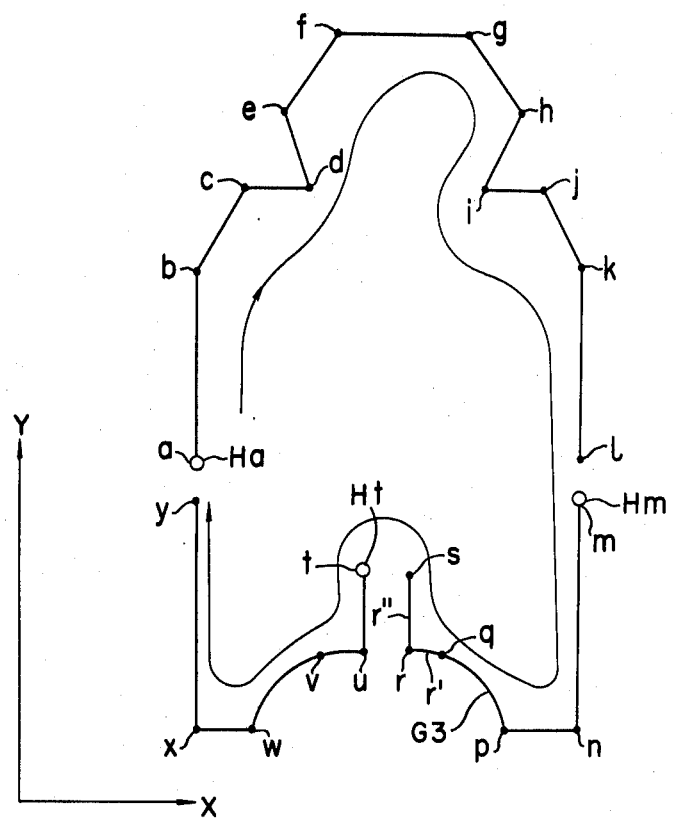
F I G. 28
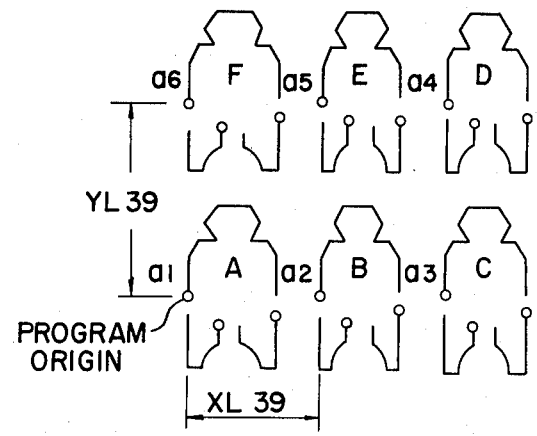

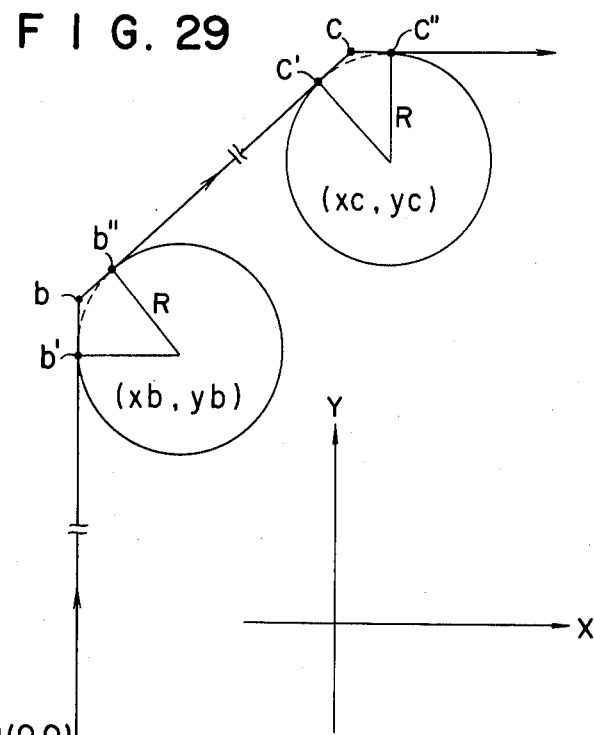
FIG. 29
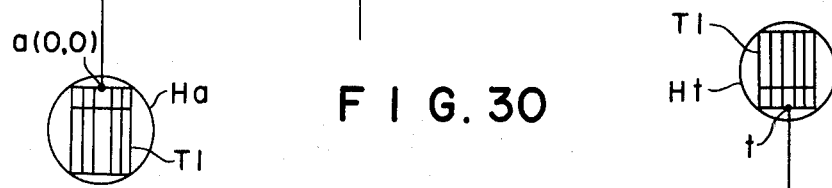
FIG. 30
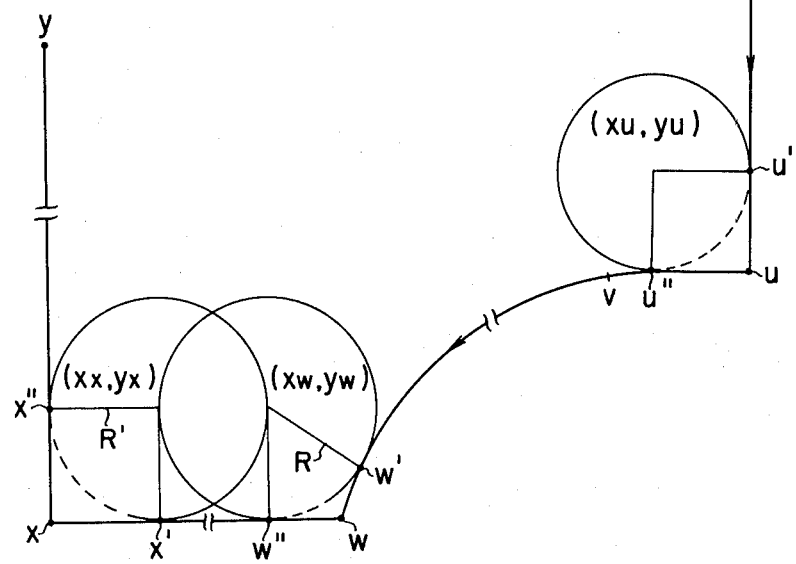

METHOD OF DETERMINING POSITION OF OPENINGS ADAPTED TO RECEIVE FRET SAW BLADE OF NUMERICALLY CONTROLLED FRET SAW MACHINES

BACKGROUND OF THE INVENTION

This invention relates to a control system of a numerically controlled fret saw machine which controls the movement of a plate shaped blank and the rotation of a fret saw blade, and more particularly a system for determining the center position of an opening adapted to receive a fret saw blade, the center position being used to form the opening through the blank with a drill.

For the sake of description, the invention will be described in connection with the manufacture of a die board utilized as a die for punching a paper board. As shown in FIG. 2, a die board is provided with a groove shaped pattern PTRN II corresponding to a desired punching or package pattern PTRN I shown in FIG. 1. A cutting blade K is implanted in a portion near PT-5 of the groove as shown in FIG. 3. At a portion J where the groove is discontinuous, the lower portion of the blade K is provided with a recess. FIGS. 4 and 5 are sectional views respectively taken along lines IV—IV and V—V in FIG. 3.

The groove shaped pattern PTRN II shown in FIG. 2 is made up of a plurality of sections PT-1, PT-2 and PT-3 separated by not cut sections PT-4, PT-5 and PT-6, respectively. More particularly, although the punching pattern PTRN I has a closed contour, the groove shaped pattern PTRN II adapted to be implanted with the cutting blade K as shown in FIG. 3 is not continuous throughout the periphery of the pattern. An arrow shown in FIG. 2 shows the course of cutting the groove. For this reason, in order to insert a fret saw blade T at a point A for starting the cutting of a groove through a section PT-3 following the not cut section PT-6 as shown in FIG. 6 which is an enlarged view of the section PT-6 shown in FIG. 2, it is necessary to position the center of a tooth of the fret saw blade at the point A and to orient the tooth in the cutting direction of the groove.

According to the prior art control system the opening HA for inserting the fret saw blade T was formed such that the cutting starting point A would come to the center of the opening. With this system, since the center of the opening coincides with the cutting starting point the position of the center of a drill can readily be determined by merely considering the spacing between the fret saw blade T and the drill. In such a case, however, the cross-sectional area of the opening HA is considerably larger than that of the fret saw blade T so that when the stamping pattern includes a number of such not cut sections or discontinuous sections, the diameter of the opening HA would cause such problems as weakening the blank and making it impossible to cut larger number of patterns out of a single blank.

SUMMARY OF THE INVENTION

It is an object of this invention to provide a method of determining the position of an opening adapted to receive a fret saw blade wherein the diameter of the opening can be minimized by causing the fret saw blade to inscribe the opening.

Another object of this invention is to provide a method of determining the position of the opening by a unique method of calculating the rectangular coordinates of the center of the opening or calculating the amount of shift between a cutting starting point and the center of the opening.

According to this invention, in a numerically controlled fret saw machine comprising blank drive means for clamping a flat plate shaped blank to move the same to any position on a X-Y plane of rectangular coordinates; fret saw blade rotating means for controlling rotation of the fret saw blade such that a tip of the blade is normally oriented in the direction of grooves cut through the blank by the fret saw blade; a tool disposed on the X-Y plane with a predetermined spacing between the tool and the fret saw blade for forming openings through the blanks; drive means for driving the tool; and a digital control device for controlling the directions of movement of the blank in X and Y axis directions of rectangular coordinates and for controlling rotation of the fret saw blade, thereby forming, with the tool, openings adapted to receive the fret saw blade at points respectively corresponding to cutting start points of the grooves, a method of determining a position of each opening comprises the steps of:

producing a movement instruction data regarding a cutting start point and a cutting end point of a position of a groove to be cut; and determining a point P having coordinates (XP·YP) and representing center of the opening for receiving the fret saw blade, the point P being located on a straight line passing through a point A having coordinates (XA·YA) and a point B having coordinates (XB·YB) and the point P being spaced from the point A by one half of the width SW of the fret saw blade in a direction opposite to the direction of cutting of the groove starting from the point A when the section is straight, whereas when the section is a circular arc, said point is selected to be on a line which is tangent to the circular arc at the point A and spaced from the point A by one half of the width SW of the fret saw blade.

BRIEF DESCRIPTION OF THE DRAWINGS

Further objects and advantages of the invention can be more fully understood from the following detailed description taken in conjunction with the accompanying drawings in which:

FIG. 18 a flow chart showing the steps of determining a pair of code values (SX) and (SY) in accordance with the absolute number of pulses p2 obtained by the flow chart shown in FIGS. 17a and 17b; and FIG. 19 a flow chart showing the steps of determining the coordinates (XP,YP) of the center of the opening according to $\theta$·(SX),(SY);

FIGS. 22a, 22b and 22c are vector diagrams helpful to understand the flow chart shown in FIG. 23;

FIGS. 26a and 26b, when combined, represent a flow chart showing still another example of the steps of determining the opening position according to this invention;

FIG. 27 is a diagram useful to explain the groove shaped pattern shown in FIG. 2;

FIG. 28 is a diagram showing an arrangement of 6 patterns shown in FIG. 27; and

FIGS. 29 and 30 are magnified diagrams, useful to explain actual cutting paths near a point of inflection of the groove shown in FIG. 27.

DESCRIPTION OF THE PREFERRED EMBODIMENT

Figure 1:
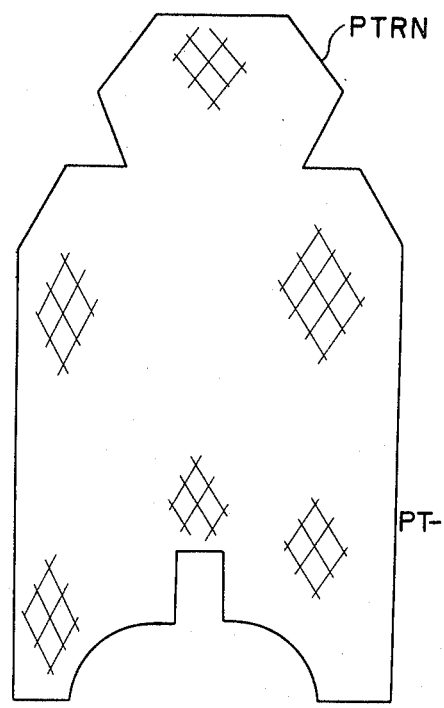
FIG. 1 shows a package pattern obtained by cutting a blank with a punching die.

A preferred embodiment of this invention will now be described with reference to FIGS. 8 through 30 of the accompanying drawings. A die board working machine shown in FIG. 8 comprises a bed 11, Y direction guide members 12 mounted on the bed, a Y direction table 13 mounted on the Y direction guide members 12, an X direction guide member 14 mounted on the Y table 13 and an X table 15 mounted on the X direction guide member 14. The X and Y tables 15 and 13 are moved in the X and Y directions respectively by pulse motors or servomotors 16 and 17 through feed screws 18 and 19. Frame members 21 and 22 for clamping the side walls of a workpiece, in this case a plate member 20, are mounted on the frames of the X table 15 to be adjustable in the X and Y directions. A plurality of spaced wheels 23 are partially embedded in the upper surface of the bed 11 for smoothly moving the plate member 20. An arm 24 is provided to project above one end of bed 11 for supporting a head 25 on its free end. Clamping members 26 and 27 are provided for clamping the upper ends of fret saw blades $T_1$ and $T_2$ which project downwardly from the lower surface of the head 25. On one side surface of the head 25 is secured a motive means, for example a pneumatic cylinder 30 for vertically moving a drive unit 29 for rotating a drill 28 to form at a desired position of the plate member 20 an opening adapted to receive a fret saw blade. Although not shown in the drawing, a mechanism for reciprocating the clamping member 27 in the vertical direction and pulse motors for rotating the fret saw blades are contained in the first head 25. A second head, not shown, similar to first head 25 and containing a mechanism for vertically reciprocating the clamping member and pulse motors for rotating respective fret saw blades is contained in the bed at a position immediately beneath the head 25. The second head is provided with a lower clamping member for automatically clamping and releasing the lower shanks of the fret saw blades $T_1$ and $T_2$. The vertically reciprocating mechanism and the pulse motors contained in the first and second heads are operated synchronously. A digital control device 31 is provided to supply instruction pulses to the pulse motors 16 and 17 of the die board working machine and pulse motors (one is shown at 34 in FIG. 9) contained in the first and second heads for rotating the fret saw blades.

Figure 8:
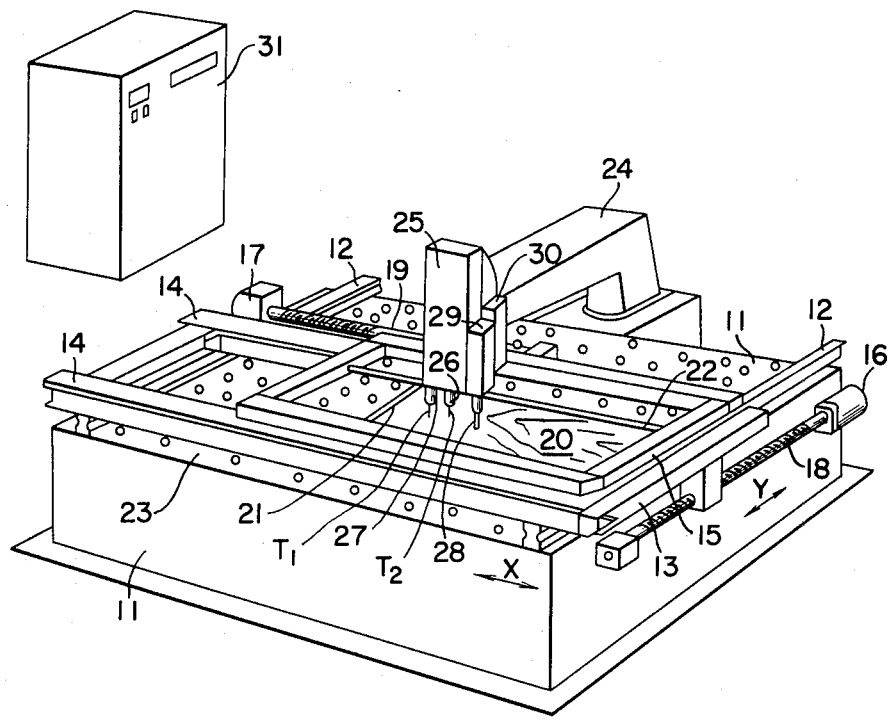
FIG. 8 is a perspective view showing one example of a die board working machine embodying the invention.
Figure 9:
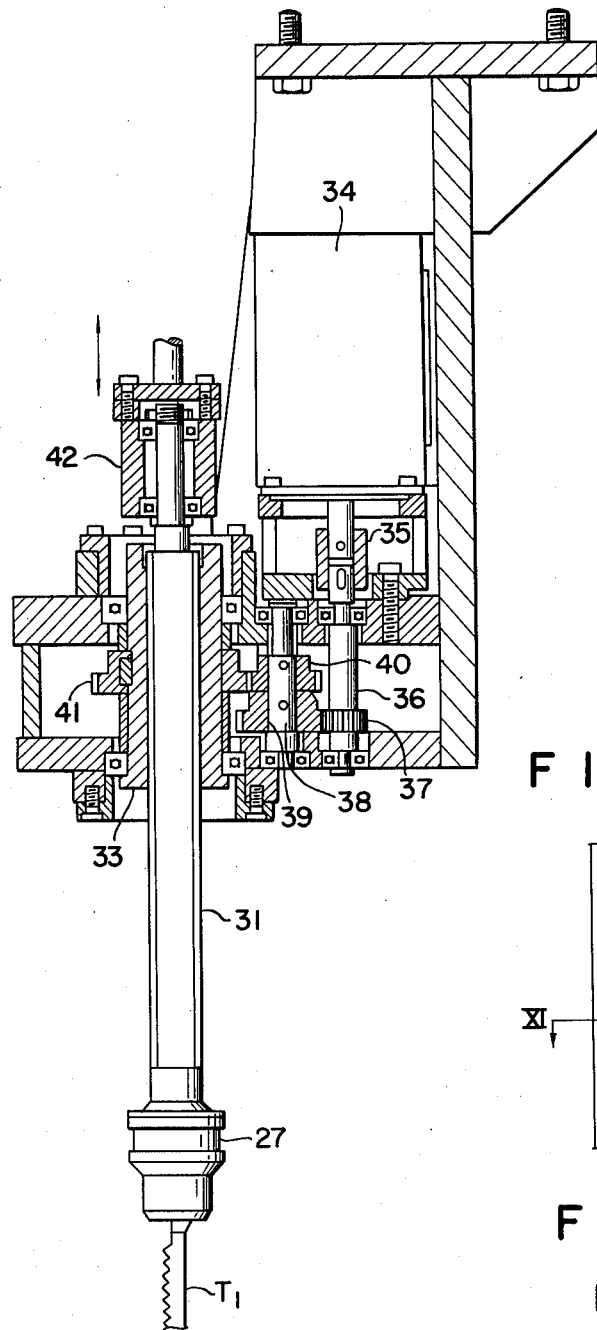
FIG. 9 is a side view, partly in section, of a driving mechanism for rotating a fret saw blade.
Figure 10:
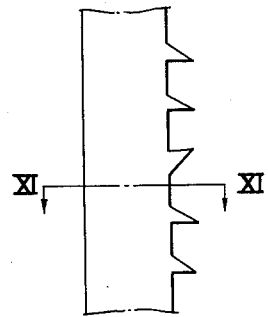
FIG. 10 is a side view showing a portion of the fret saw blade.
Figure 11:
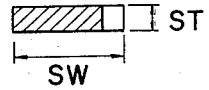
FIG. 11 is a cross-sectional view of the fret saw blade shown in FIG. 10 taken along a line XI—XI.

FIG. 9 shows a fret saw blade rotating device contained in the head 25 shown in FIG. 8. As shown, the output of the pulse motor 34 is transmitted to shaft 36 via a coupling member 35 for driving a male spline shaft 31 via gears 37 and 39, shaft 38, gears 40 and 41 and a female spline shaft 33. An upper chuck 27 for clamping the upper end of the fret saw blade $T_1$ is secured to the lower end of the spline shaft 31. To the upper end of the spline shaft 31 is connected a member 42 supported by a pair of thrust bearings and coupled to a vertical reciprocating mechanism, not shown, contained in the head 25. The reciprocating mechanism is constituted by a rotating shaft and a link mechanism, for example.

Figure 12:
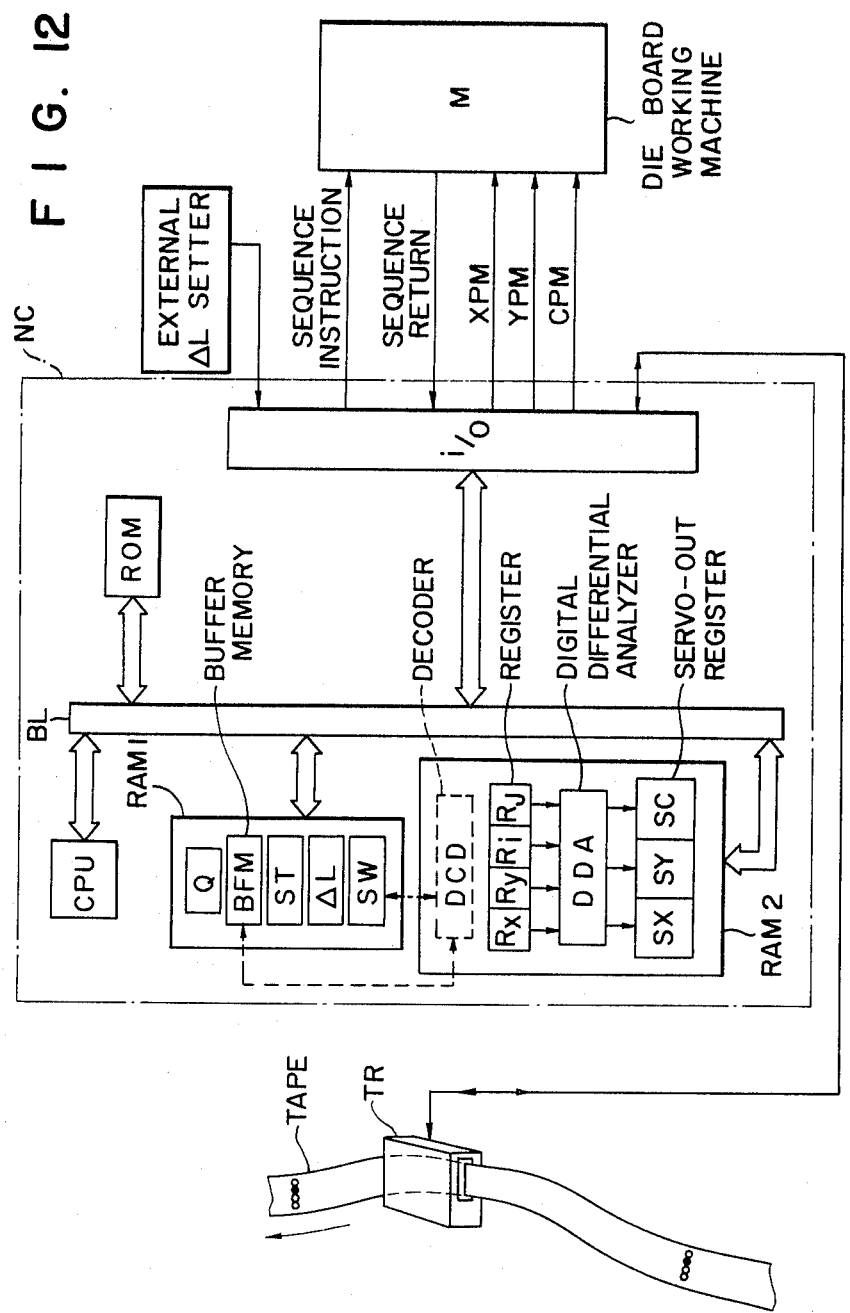
FIG. 12 is a block diagram of a control circuit of the machine shown in FIG. 9.

FIG. 12 is a block diagram showing a digital control device constituted by a microcomputer system which functions to generate instruction pulses for relatively moving the fret saw blade T and the workpiece that is a die board (actually the die board is moved) in the X and Y directions, and the instruction pulses for controlling the orientation of the fret saw blade T, for controlling switch-backs at corner portions, and for determining the position of a fret saw blade inserting opening. In FIG. 12, the contents of respective blocks of a program tape are read by a tape reader TR and stored in a buffer memory section BFM of a RAM1 through an input-output interface i/o and a bus line BL. The content of the buffer memory section BFM is set in shaft movement set registers $R_x$, $R_y$, $R_i$ and $R_j$ of a RAM2 via bus line BL. An overflow of a digital differential analyzer DDA is applied to servoout registers $S_x$, $S_y$ and $S_c$ respectively to act as instruction pulse generators for respective servomotors, the instruction pulses being applied to the die board working machine M via the bus line BL and the interface i/o as signals XPM, YPM and CPM.

Respective processing steps (program execution instructions) for reading the contents of respective blocks with tape reader TR, decoding the read out contents and finally applying respective instruction pulses XPM, YPM and CPM are prestored in a ROM acting as a program memory device connected to the bus line BL, the ROM being connected to cooperate with a central processing unit CPU for sequentially executing the steps described above. A decoder DCD shown by dotted lines in RAM2 functions to decode the content of the buffer memory section BFM for calculating a value to be set in registers $R_x$ and $R_y$ in the case of a linear cutting and a value to be set in registers $R_x$, $R_y$, $R_i$ and $R_j$ in the case of an arcuate cutting (including a corner cutting). A memory area ΔL corresponding to the amount of switch-back is also shown in a block representing RAM1. Where ΔL is set by an external setter SΔL, or set in accordance with the data regarding the tooth thickness ST of the fret saw blade T given by a working program (in this case it is not necessary to set ΔL from outside), or set by the result of calculations made at respective points of inflection.

With any method, for the forward stroke, ΔLX is given as a value for register RX, and LY as a value of register RY. Furthermore, RAM1 shown in FIG. 12 stores data regarding the thickness ST and width SW of a tooth of a fret saw blade shown in FIGS. 10 and 11 and angle data θ regarding shaft C for rotating the fret saw blade. As will be described later in detail, the angle data is used to control axis C, but in a modified embodiment of this invention, the angle data θ is used to determine the center position of the opening to be formed.

Figure 13:
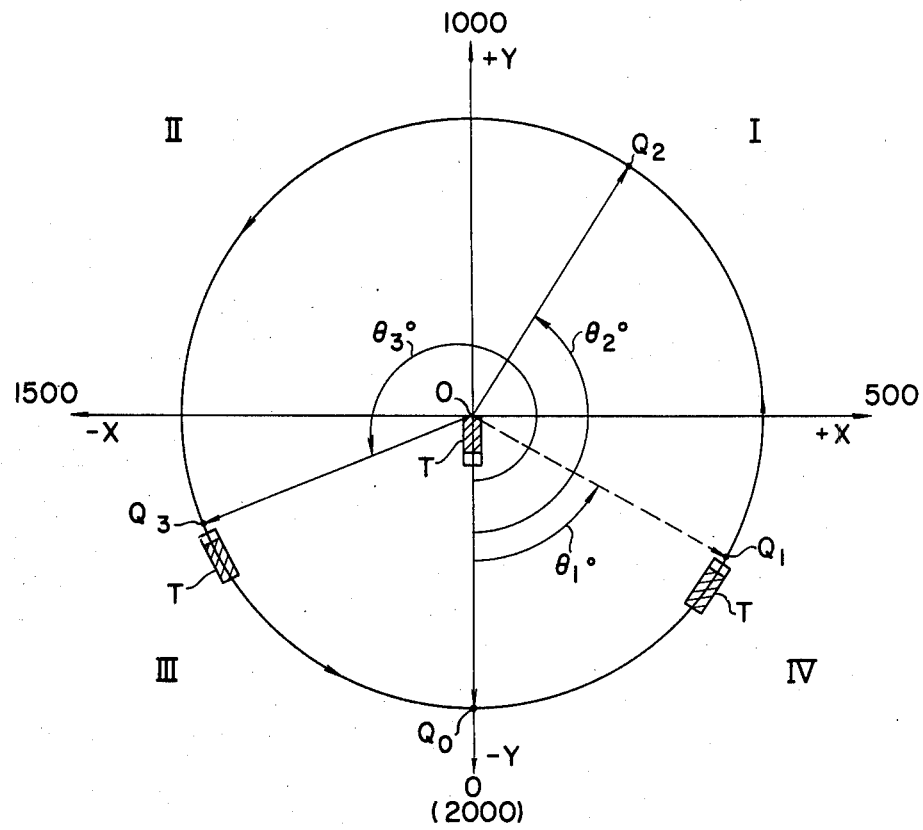
FIG. 13 is a diagram showing the relationship between the amount of rotation of the fret saw blade and a X-Y rectangular coordinate system.

FIG. 13 is a diagram useful to explain the rotation control (C axis control) of the fret saw blade. In the rectangular coordinate system shown in FIG. 13, it is possible to instruct for directing the fret saw blade T in any orientation about the origin O. The orientation instruction is given in terms of counterclockwise rotation angles measured from the direction of $-Y$ wherein an angle 0.18° obtained by equally dividing a circle with 2000 is utilized as a minimum unit (one pulse). For example, where the center of the tip of a tooth of the fret saw blade is directed along a vector $\overrightarrow{O \cdot Q1}$ the count $C_{ABS}$ of the C axis absolute counter is given by an equation $$C_{ABS}(Q1) = \frac{\theta 1}{0.18}$$

Similarly, in the cases of $\overrightarrow{O \cdot Q2}$ and $\overrightarrow{O \cdot Q3}$ $$C_{ABS}(Q2) = \frac{\theta 2}{0.18}$$

$$C_{ABS}(Q3) = \frac{\theta 3}{0.18}$$

When a circular arc is to be cut in the counterclockwise direction from a start point Q1 to an end point Q2, the orientation of the tooth tip of the fret saw blade at the start point Q1 is given by the following equation as can be noted from the drawing:

$$\theta° = \theta 1° + 90°$$

In the same manner, when a circular arc is to be cut in the clockwise direction from start point Q3 to end point Q2 the orientation of the tooth tip of the fret saw blade T is given by $$\theta° = \theta 3° - 90°$$

In FIG. 13, I–IV represent first to fourth quardrants.
Directions of coordinate axes $-Y$, X, Y and $-X$ respectively correspond to pulse numbers 0(2000), 500, 1000 and 1500, that is the counts $C_{ABS}$ of the absolute value counter.

Figure 14:
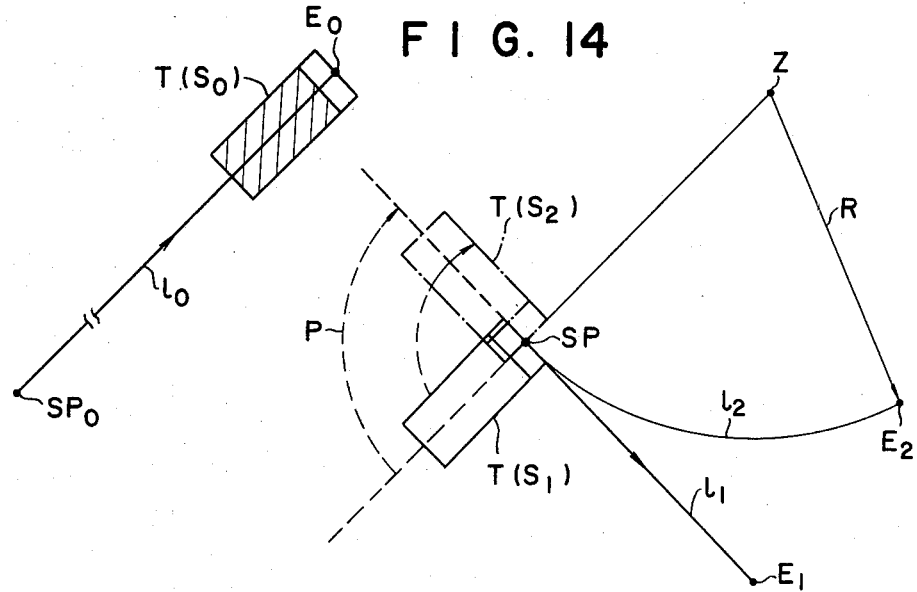
FIG. 14 is diagram for explaining the manner of moving along a line l1 and l2 and rotating the fret saw blade to cut the slot along a line l0.
Figure 15:
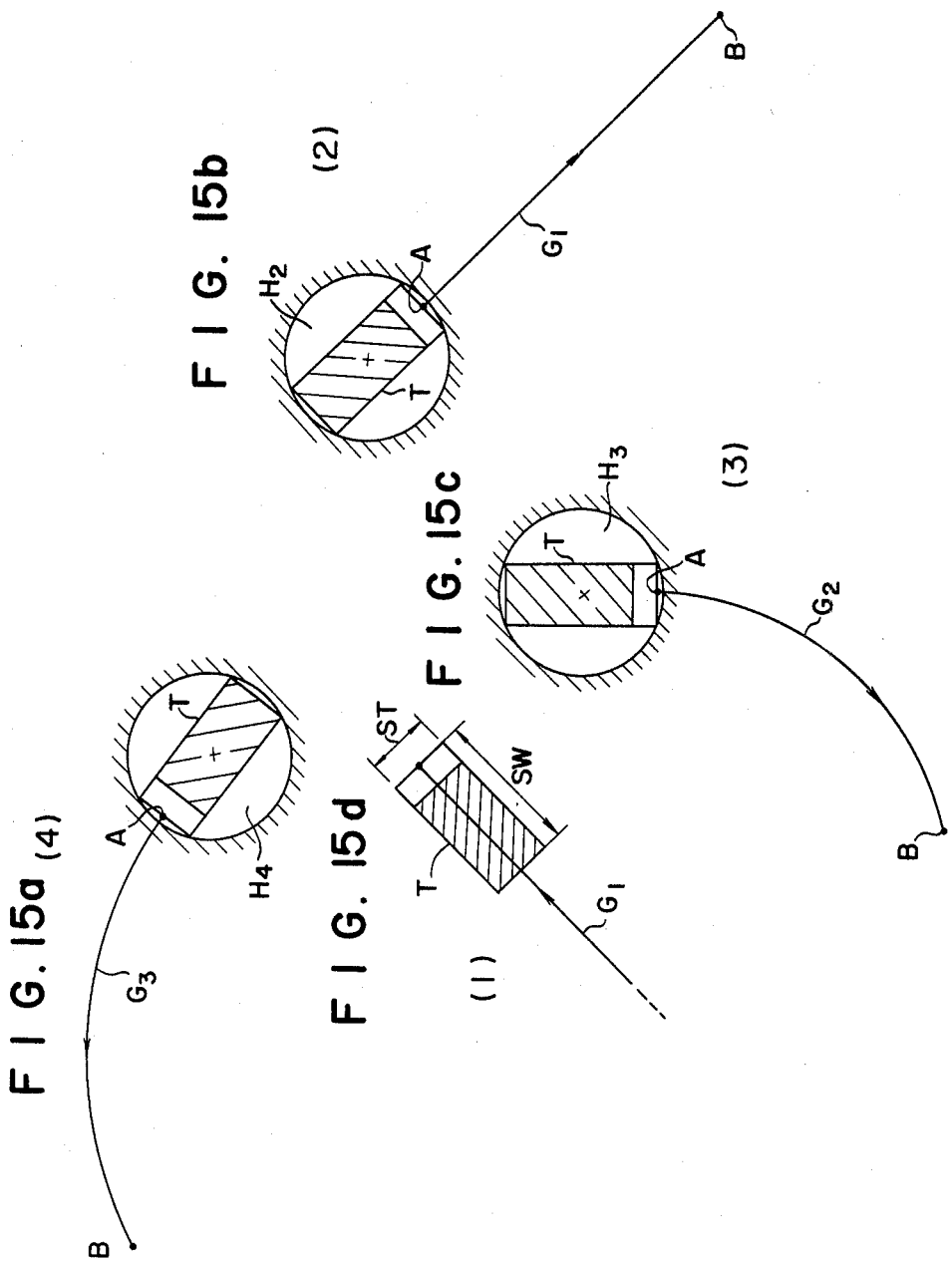
FIGS. 15a–15d show the relationship between the orientation of the fret saw blade at the cutting starting point A and the opening in which the fret saw blade is to be inserted when the path A→B is straight or arcuate, when the fret saw blade is moved respectively to states shown in FIGS. 15a through 15c from a state shown in FIG. 15d.

FIG. 14 shows the sequence operation for driving the C axis of the illustrated embodiment. The following instruction codes are given for cutting a groove from point SPO to a point EO along a straight line 10 (the orientation of the blade at this time is designated by T(S0)), and then to bring the blade to a state T(S2) at a point SP for starting the cutting of a straight line 11 or a circular arc 12. However, the sequences of pulling out and inserting the fret saw blade into the opening are omitted.

① A case wherein a straight line 11 is to be cut from point SP to point E1.

G1 X(SPO)–X( )·Y(SPO)–Y( )

G1 X(EO)–X(SPO)·Y(EO)–Y(SPO)

G0 X(SP)–X(EO)·Y(SP)–X(EO)

→G1 X(E1)–X(SP)·(Y(E1)–Y(SP)

② A case wherein a circular arc 12 is to be cut from point SP to point E2.

G1 X(SPO)–X( )·Y(SPO)–Y( )

G1 X(EO)–X(SPO)·Y(EO)–Y(SPO)

G0 X(SP)–X(EO)·Y(SP)–Y(EO)

→G3 X(E2)–X(SP)·Y(E2)–Y(SP)·

X(SP)–X(Z)·Y(SP)–Y(Z)

In the parentheses ( ) of X( ) and Y( ) are included the X and Y absolute coordinate values of the position of points.

In the cases ① and ②, only the movements along X and Y axes are performed to reach state T(S1) while the fret saw blade is at a state T(SO) that is withdrawn from the die board, and the C axis is maintained at state T(SO) by an instruction code GO. When a code following code GO and labelled with an arrow is read out at an angle corresponding to a vector $\overrightarrow{SP \cdot E1}$, that is a pulse number is calculated according to a method already explained with reference to FIG. 13. Let us denote this value by $$p2 = p(\theta SP \cdot E1)$$

and the pulse numbers corresponding to vector $\overrightarrow{SPO \cdot EO}$ by $$p1 = p(\theta SPO \cdot EO).$$

Thus, the C axis is rotated by the difference $\Delta p = p2 - p1$ to bring the orientation of the fret saw blade to the state of T(S2). Under this state, the fret saw blade is moved to point E1 in the X and Y directions. Of course before commencement of the axis movement, the fret saw blade is inserted into the opening and reciprocated in the vertical direction. In the case of ②, since the C axis is rotated in the counterclockwise direction (G3 code), as above described at cutting start point SP, 90° is added to angle $\theta Z \cdot SP$ corresponding to vector $\overrightarrow{Z \cdot SP}$ so that $$p2 = p(\theta Z \cdot SP) + 500$$

$$p1 = p(\theta SPO \cdot EO)$$

Hence
$$\Delta p = p2 - p1$$

In FIG. 14, vectors $\overrightarrow{SPO \cdot EO}$ and $\overrightarrow{SP \cdot Z}$ have the same direction. This means that T(S2) coincides in both case ① and ②.

FIGS. 15a, 15b and 15c show the orientation of the tooth tip of the fret saw blade T when its state is changed from state (1) to (2), (3) and (4).

In state (2) the tip of the tooth of the saw tooth blade T is positioned at the cutting start point A and the tooth tip is oriented toward point B. The center X of an opening H2 adapted to receive the fret saw blade T is located on the extension of a straight line BA at a point spaced one half of the tooth width SW from the tip. The diameter of the opening should be selected such that the fret saw blade nearly inscribes the inner surface of the opening.

In states (3) and (4), the circular arcs from the cutting point A to the end point B extend in the clockwise direction G2 and the counterclockwise direction G3 respectively, and the centers of openings H3 and H4 are positioned at points on tangential lines through point A, the points being spaced from point A by ½SW in a direction opposite to the cutting direction.

Figure 16:
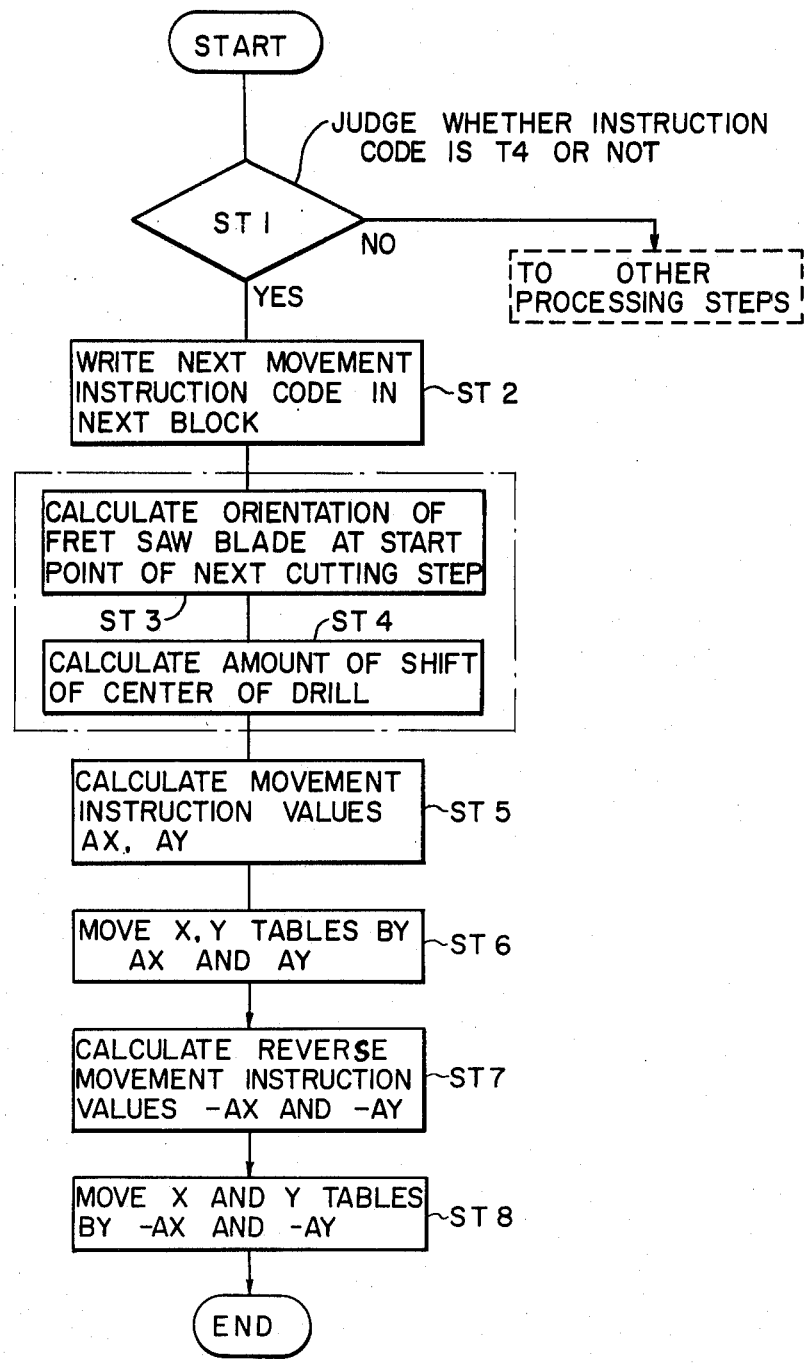
FIG. 16 is a flow chart useful to explain the process steps for forming the opening adapted to receive the fret saw blade.

Turning now to a flow chart shown in FIG. 16 which shows the process steps of axis movement necessary for forming an opening adapted to receive a fret saw blade, at step ST1 a judgement is made whether the instruction code is T4 or not, and when the result of the judgement is YES, the process is advanced to step ST2 to write next movement instruction code in the next block for forming the opening. At the next step ST3, the orientation (angle) of the fret saw blade at the start point of the next cutting step is calculated based on the data written in step ST2. Then the process is advanced to step ST4 where the amount of shift of the center of a drill utilized to form the opening is calculated. At step ST5, movement instruction values AX and AY are calculated by adding the spacing between the fret saw blade and the drill diameter to the amount of shift of the center of the drill. Then, at step ST6 X and Y tables are moved by AX and AY. At step ST7 reverse movement instruction values $-AX$ and $-AY$ are calculated and at step ST8, X and Y tables are returned to the original position by moving the X and Y tables by $-AX$ and $-AY$ respectively.

Figure 17A:
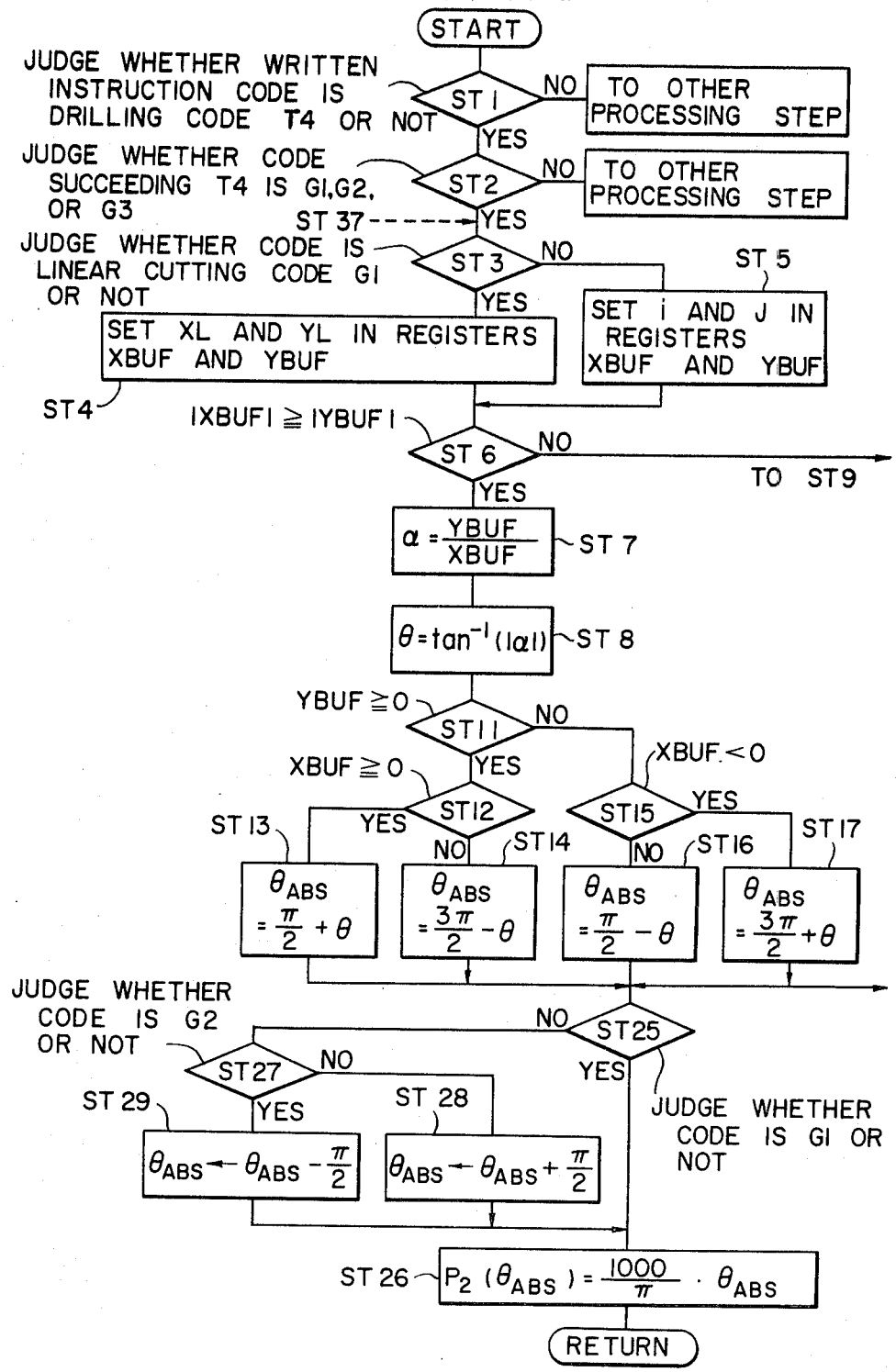
FIGS. 17a, 17b, 18 and 19 show flow charts explaining a method of determining the position of an opening according to this invention by utilizing an angle $\theta$, wherein FIGS. 17a and 17b, when combined, show a flow chart showing the steps of calculating an absolute number of pulses p2 corresponding to the orientation of the fret saw blade at a new slot cutting starting position.
Figure 17B:
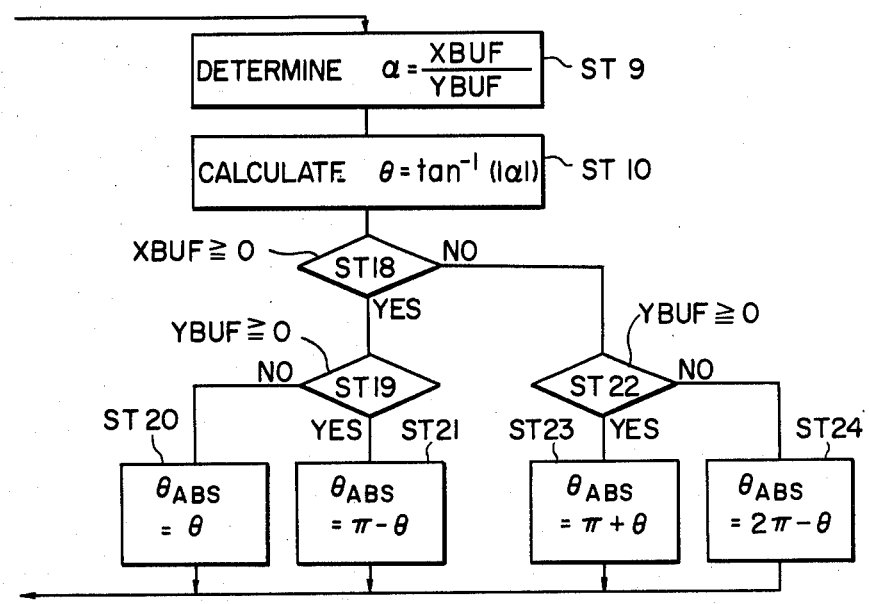
Figure 18:
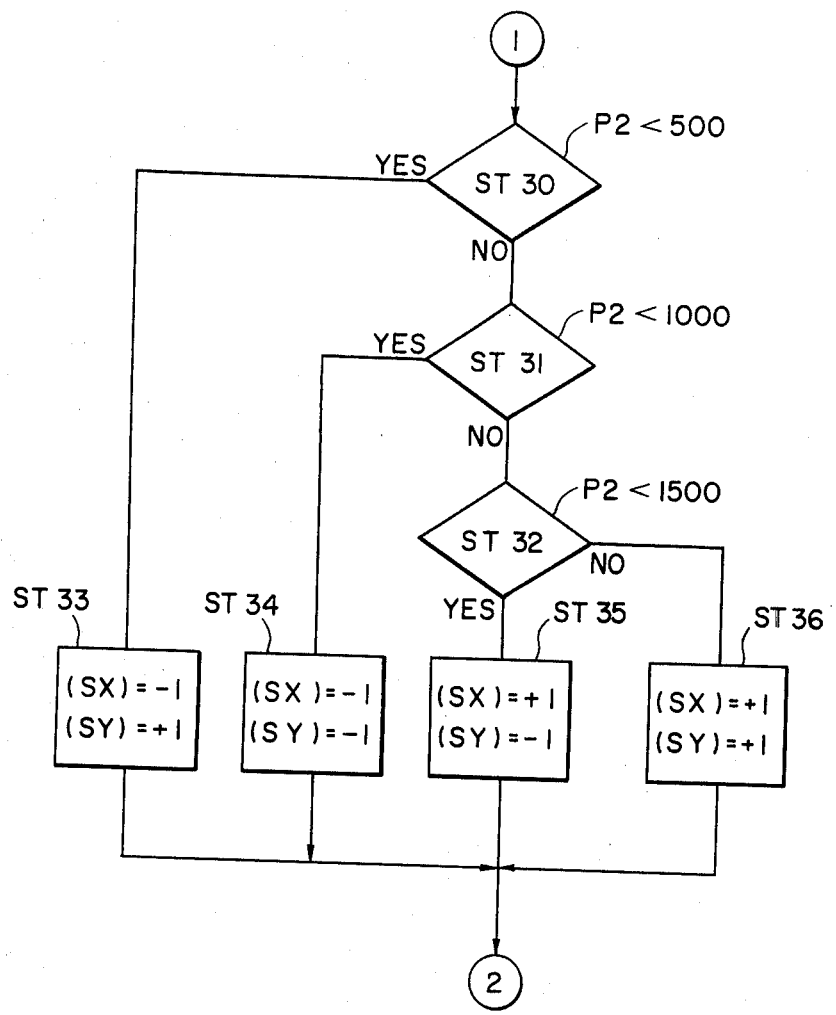

FIGS. 17a, 17b, FIG. 18 and FIG. 19 show one example of the method of determining the position of the opening for receiving the fret saw blade, in which the flow chart shown in FIGS. 17a and 17b shows a routine for determining the orientation of the fret saw blade calculated by data regarding the start point A and the end point B (see FIGS. 15a through 15d) of cutting the next groove after drilling by utilizing the pulse number whereas the flow chart shown in FIG. 18 shows a routine for calculating the data of codes (SX)·(SY) which are necessary to determine the position of the center (shown by X in FIGS. 15a–15d) of the drilled opening by using a relationship $$\theta = \tan^{-1}(\alpha)$$

which is determined by the routine shown in FIGS. 17a and 17b. As shown by (1) and (2) in FIG. 20, the relationship between the center P of the opening and point A necessary to position the fret saw blade at the cutting start point A is as follows.

More particularly, a position displaced from point A by ½SW·cos θ or ½SW·sin θ in the X direction, and by ½SW·sin θ or ½SW·cos θ in the Y direction in a direction opposite to $\overrightarrow{AB}$ is designated as point P. Thus, where the path A→B is a straight line there are the following cases.

I. Where $|XBUF| \geqq |YBUF|$ $$\left. \begin{array}{l} XP = XA + (SX) \cdot \tfrac{1}{2}SW \cdot \cos \theta \\ YP = YA + (SY) \cdot \tfrac{1}{2}SW \cdot \sin \theta \end{array} \right\} ①$$

II. Where $|XBUF| < |YBUF|$ $$\left. \begin{array}{l} XP = XA + (SX) \cdot \tfrac{1}{2}SW \cdot \sin \theta \\ YP = YA + (SY) \cdot \tfrac{1}{2}SW \cdot \cos \theta \end{array} \right\} ②$$

Where the path A → B is a circular arc:

III. where $|XBUF| \geqq |YBUF|$ $$\left. \begin{array}{l} XP = XA + (SX) \cdot \tfrac{1}{2}SW \cdot \sin \theta \\ YP = YA + (SY) \cdot \tfrac{1}{2}SW \cdot \cos \theta \end{array} \right\} ②$$

IV. Where $|XBUF| < |YBUF|$ $$\left. \begin{array}{l} XP = XA + (SX) \cdot \tfrac{1}{2}SW \cdot \cos \theta \\ YP = YA + (SY) \cdot \tfrac{1}{2}SW \cdot \sin \theta \end{array} \right\} ①$$

In the above, $\theta \leqq \tfrac{1}{4}\pi$ and XBUF and YBUF represent the X and Y components of vector $\overrightarrow{AB}$ when the path A→B is a straight line, whereas when it is a circular path respectively represent the X and Y components of a vector extending between the center of the arc and start point A.

Figure 21:
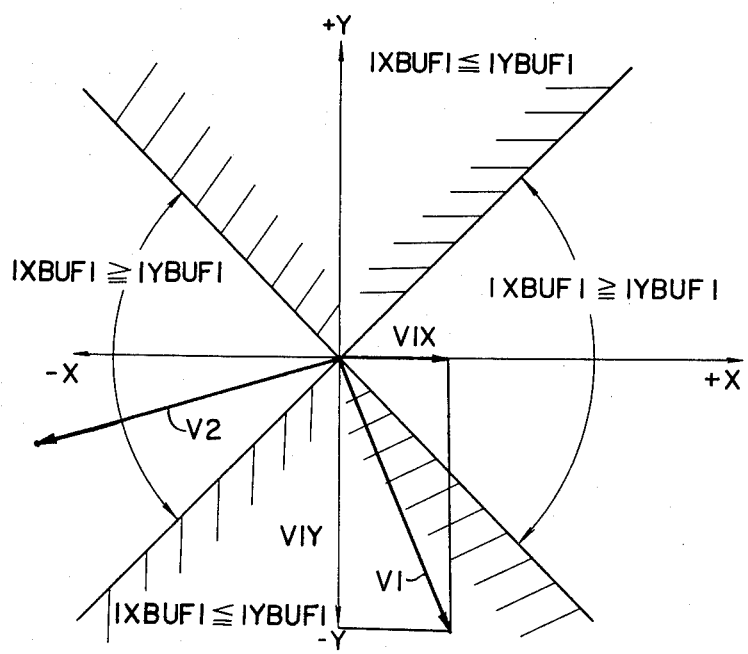
FIG. 21 is a diagram for descriminating regions XBUF and YBUF in the X-Y rectangular coordinate system.

FIG. 21 shows regions in which $|XBUF| \geqq |YBF|$ and $|SBUF| \leqq |YBUF|$. In this figure, regarding vector V1, for example, if we put $$XBUF = +V1X$$

$$YBUF = -V1Y$$

then $$|SBUF| < |YBUF|.$$

Similarly, vector V2 is in a region in which $$|XBUF| \geqq |YBUF|.$$

Figure 20:
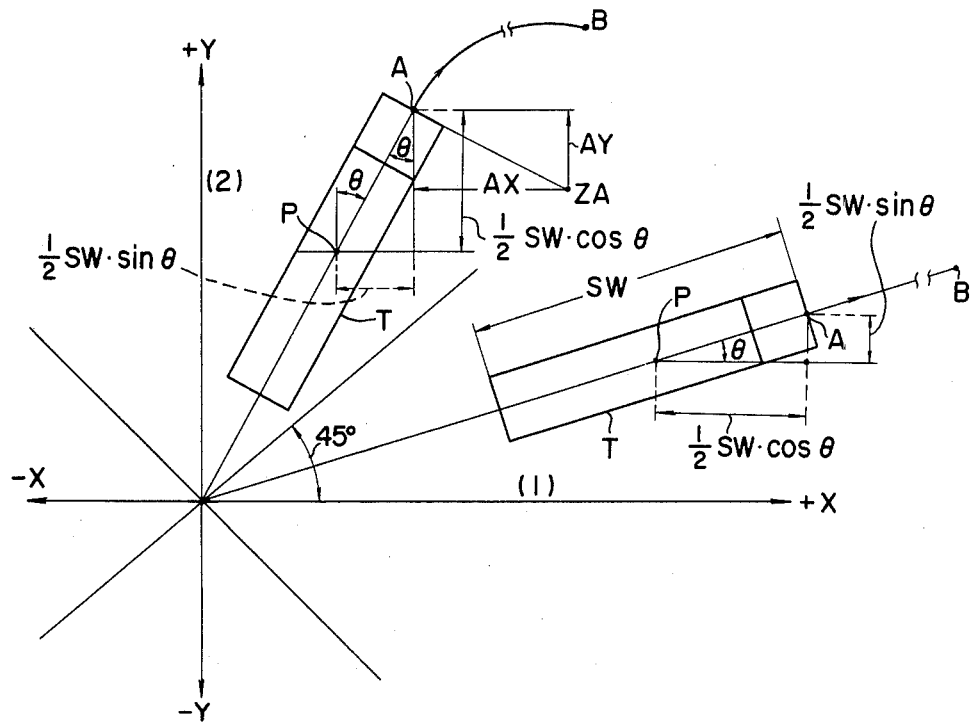
FIG. 20 is a diagram useful to understand the flow charts described above.

In above described equations ① and ②, (SY)·(SY) has a sign of +·−, but in (1) and (2) of FIG. 20, $(SX) = -1$ and $(SY) = -1$.

In (1), since vector $\overrightarrow{AB}$ is in a region of $|XBUF| \geq |YBUF|$ shown in FIG. 21 the amount of movement can be calculated from equation ①. In (2) of FIG. 20, let us denote the components of a vector extending from the center ZA of a circular arc by AX and AY, then $XBUF = AX$.

$YBUF = AY$.

As can be noted from this figure, since $|XBUF| > |YBUF|$ the amount of movement (distance) can be calculated from equation ②.

Let us now described the flow chart shown in FIGS. 17a, 17b, 18 and 19. In FIG. 17a, after starting, at step ST1, a judgement is made whether a written instruction code is a drilling code T4 or not. Then, at step ST2, a judgement is made whether a code succeeding the T4 code is an instruction code for a linear cutting G1, a circular arc cutting G2 or other instruction code G3 or not. When the result of judgement at step ST2 is code G1, G2 or G3, the step is advanced to step ST3 where judgement is made whether the code is the linear cutting code or not. When the result of judgement at step ST3 is a G1 code, then at step ST4, data XL and YL succeeding G1 code are set in XBUF and YBUF registers, where XL and YL represent X and Y increments from the start point A to the end point B. When the result of judgement at step ST3 is the G2 code or the G3 code, at step ST5, i and J are set in registers XBUF and YBUF respectively, where i and J represent X and Y increments respectively from the center of the circular arc to the start point. Then, at step ST6 the absolute values of XBUF and YBUF are compared with each other and when $|XBUF| \geq |YBUF|$ the value of $\alpha$ is determined at step ST7. Then, at step ST8 $\theta = \tan^{-1}(|\alpha|)$ is calculated. If the result of comparison at step ST6 is NO, $\alpha$ is determined at step ST9 and $\alpha$ is calculated at step ST10.

For this reason, the value of $\alpha$ calculated at steps 8 and 10 always satisfies the following relationship.

$0 < \theta \leq \frac{1}{4}\pi$

At step ST11, a judgement is made whether $YBUF \geq 0$ or not, and when the result is YES at step 12 a judgement is made whether $XBUF \geq 0$ or not. When the result is YES at step ST13 an absolute angle $\theta ABS$ is given as $\pi/2 + \theta$. If the result of the judgement at step ST12 is NO, at step ST14 the absolute angle $\theta ABS$ is given as $3/2\pi - \theta$. If the result of judgement at step ST11 is NO the step is advanced to step ST15 where a judgement is made whether $XBUF < 0$ or not. When the result of the judgement at step ST15 is NO the step is advanced to step ST16 where $\theta ABS$ is given as $\theta AB = \pi/2 - \theta$. If the result of judgement at step ST15 is YES, at step ST17 $\theta ABS$ is given as $\theta ABS = 3/2\pi + \theta$.

Steps 18 through 24 are executed in the same manner as steps 11 through 17 to calculate $\theta ABS$ as $(\pi - \theta)$, $\theta$, $(\pi + \theta)$ and $(2\pi - \theta)$ respectively as shown in FIG. 17b.

At step ST25, a judgement is made as to whether the code is G1 or not, and when the result of judgement is YES, at step ST26, the number of pulses P2($\theta ABS$) corresponding to respective calculated $\theta ABSs$ is calculated. As has been pointed out, since the number of pulses is selected such that the entire periphery of $2\pi$ radians is made to correspond to 2000 pulses, P2($\theta ABS$) is equal to $1000/\theta \cdot \theta ABS$. When the result of judgement at step ST25 is NO, the process is advanced to step ST27 to judge whether the code is G2(clockwise) or not. When the result is YES, $(\theta ABS - \pi/2)$ is given as $\theta ABS$ at step ST29, whereas when the result is NO, that is counterclockwise G3, then $(\theta AS + \pi/2)$ is given at step ST28.

At steps ST30 through ST32, the quadrants of the vectors corresponding to the number of pulses $P2 = P2(\theta ABS)$ calculated at step ST26 are judged. $P2 = 0$ means the $-Y$ axis so that a number of pulses P2 corresponds to an angle spaced from this axis in the counterclockwise direction (see FIG. 13). Consequently, when the result of the judgement at step ST30 is $0 < P2 < 500$ the vector is in the fourth quadrant whereby at step ST33, (SX) and (SY) are defined. In the same manner, at steps ST33, ST34, ST35 and ST36, (SX) and (SY) are defined. The manner of setting values $+1$ and $-1$ of (SX) and (SY) will be described by taking step ST33 as an example. The vector corresponding to $0 < P2 < 500$ is in the fourth quadrant and this vector has a direction of from the cutting start point A to the end point B (in the case of a circular arc in the direction of a tangential line through start point A), whereas a vector in the opposite direction lies in the second quadrant and its X component is $(-)$ and the Y component is $(+)$ so that (SX) and (SY) are given with values $(-1)$ and $(+1)$ respectively.

Figure 19:
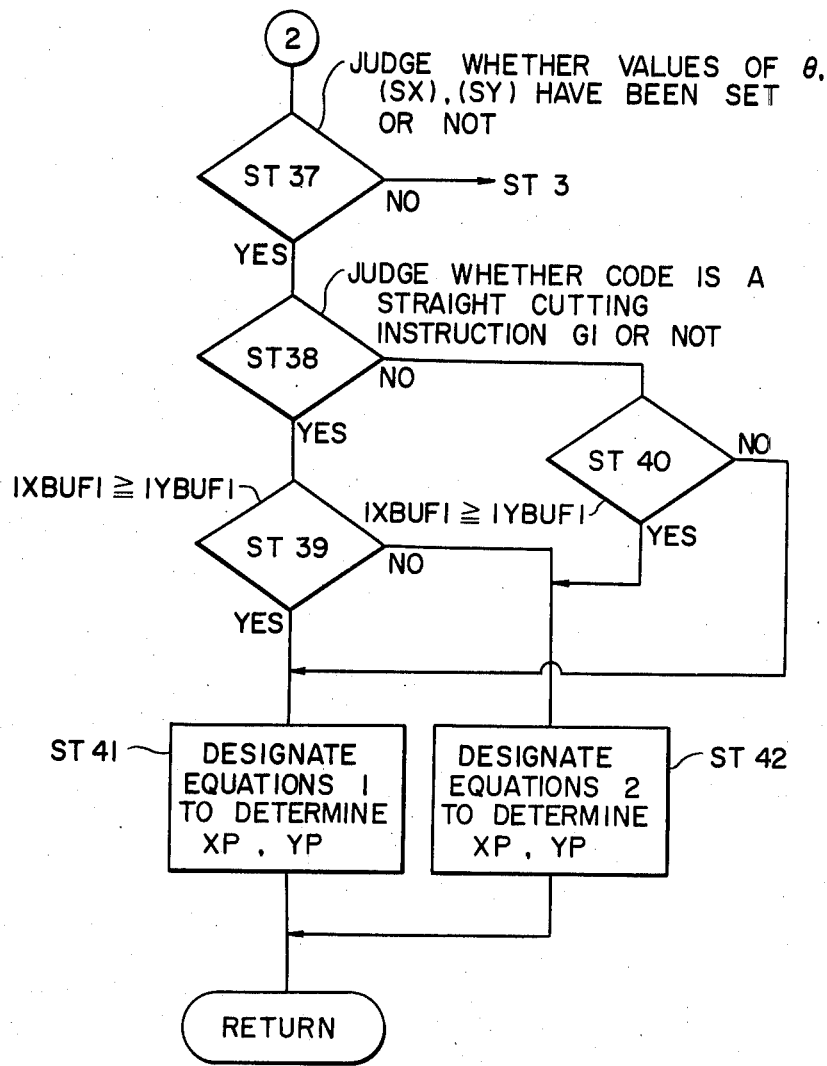

The flow chart shown in FIG. 19 is used to select equations ① and ② described above. At step ST37, a judgement is made whether the values of $\theta$, (SX) and (SY) have been set or not. When the result of the judgement is NO, the process is returned to step ST3 shown in FIG. 17a, whereas when the result is YES, the step is advanced to step ST38 where a judgement is made whether the code is a straight line cutting instruction G1 or not and when the result of the judgement is YES, the process is advanced to step ST39. However, when the result of the judgement is NO, that is the code is G2 or G3, the process is advanced to step ST40. When the result of the judgement at step ST39 is YES, at step 41, equation ① is designated to determine XP and YP, whereas when the result is NO, at step ST42, equation ② is designated to determine XP and YP. When the result of the judgement at step ST40 is YES, the step ST42 would be executed, whereas when the result is NO the step ST41 would be executed (see FIG. 20, (1) and (2)).

Figure 22B:
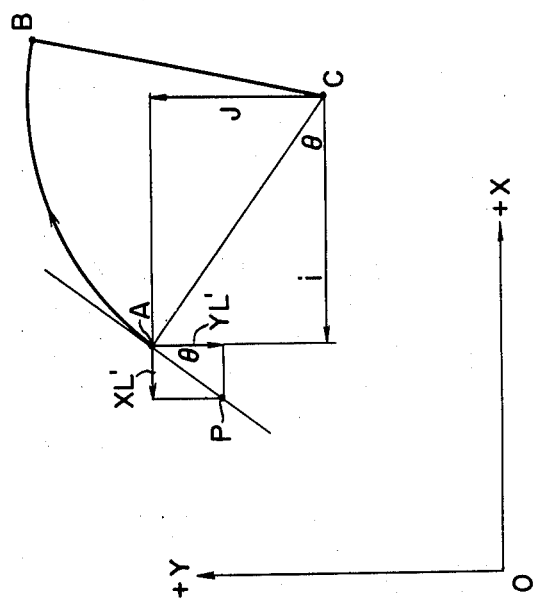
Figure 22A:
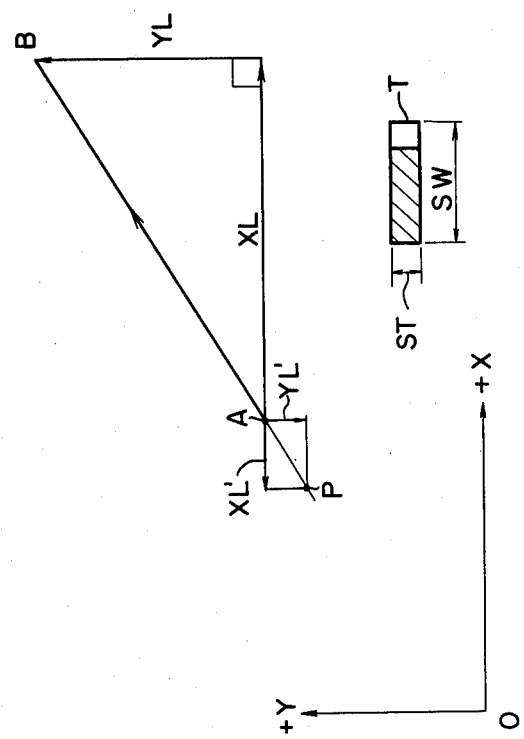

FIGS. 22a-22c, and FIG. 23 show another embodiment of this invention in which FIG. 22a shows the relationship between the start point A for cutting a straight line (A→B) groove and the center P of the opening in which XL' and YL' show the amounts of shift from the start point A. According to the law of similarity of a triangle, the following equations hold.

$\overline{AB}: |XL| = \overline{AP}: |XL'|$ $\overline{AB}: |YL| = \overline{AP}: |YL'|$ Therefore, by substituting $\overline{AB} = \sqrt{XL^2 + YL^2}$ -continued $$\overline{AP} = \tfrac{1}{2}SW$$

and by taking into consideration the fact that the point P is situated on the side opposite to the direction of A→B, we obtain $$XL' = -XL \cdot \frac{SW}{2\sqrt{XL^2 + YL^2}}$$

$$YL' = -YL \cdot \frac{SW}{2\sqrt{XL^2 + YL^2}}$$

Hence the coordinates of points P are given as $$XP = XA + XL'$$

$$YP = YA + YL'$$

FIG. 22b shows the relationship between the start point A and the center P of the opening at the time of cutting a circular arc.

When point C is taken as the center of the circular arc, according to the law of similarity of a triangle the following equations hold.

$$\overline{AC}: 32 \; \overline{AP}: YL'$$

$$AC: J = AP: XL'$$

By substituting $$AC = \sqrt{i^2 + J^2}$$
$$AP = \tfrac{1}{2}SW$$

and by taking into consideration the fact that point P is situated on the side opposite to a direction A→B, we obtain the following equations.

$$XL' = (SX) \cdot |J| \cdot \frac{SW}{2\sqrt{i^2 + J^2}}$$

$$YL' = (SY) \cdot |i| \cdot \frac{SW}{2\sqrt{i^2 + J^2}}$$

where (SX) and (SY) represent a condition that a circular arc from point A to point B corresponds to code G2 or G3, and a condition that point A lies in a specific quadrant of the rectangular coordinates. FIG. 22c shows the relationship between point A and point P when the codes are G2 and G3.

For example, when the code is A2 and when point A is in the first quardrant, XL' in the above described equations is negative and YL' is positive, thus $$(SX) = -1 \text{ and } (SY) = +1.$$

Figure 23:
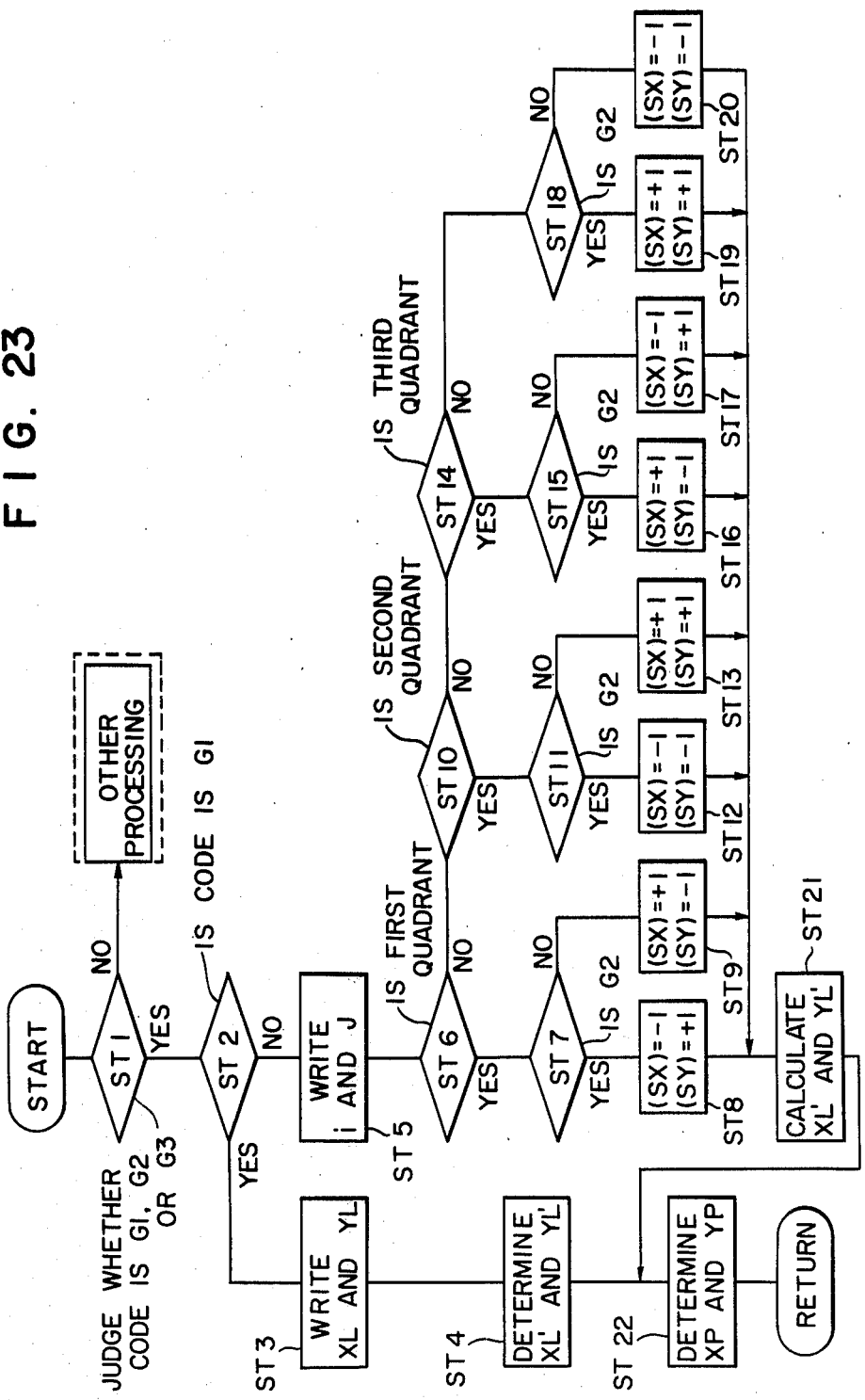
FIG. 23 shows a flow chart showing another example of the steps of determining the opening position according to this invention.

FIG. 23 shows a flow chart showing the procedures of FIGS. 22a–22c.

At step ST1, a judgement is made whether the codes are G1, G2 and G3 or not. When the result is YES, at step ST2, code G1 is checked. When the code is judged as G1 (leaner), at step ST3, XL and YL succeeding code G1 are written and at step ST4, values of XL' and YL' are calculated as follows.

$$XL' = -XL \cdot \frac{SW}{2\sqrt{XL^2 + YL^2}}$$

-continued
$$YL' = -YL \cdot \frac{SW}{2\sqrt{XL^2 + YL^2}}$$

If the result of step ST2 is NO, at step ST5, data i and J succeeding code G2 or G3 are written and at steps 6, 10 and 14, quadrants are judged. Then, at steps 7, 11, 15 and 18 judgements are made whether the code is G2 (YES) or G3 (NO), and at steps 8, 9, 12, 13, 16, 17, 19 and 20 values of (SX) and (SY) are determined as indicated. At step ST21 the values of XL' and YL' are determined as follows.

$$XL' = (SX) \cdot |J| \cdot \frac{SW}{2\sqrt{i^2 + J^2}}$$

$$YL' = (SY) \cdot |i| \cdot \frac{SW}{2\sqrt{i^2 + J^2}}$$

Thereafter, at step ST22 the rectangular coordinates of point P are determined as follows.

$$XP = XA + XL'$$

$$YP = YA + YL'$$

According to the method of determining the position of the opening which has been described in connection with FIGS. 22a–22c and FIG. 23, since no process step is required to determine angle θ, the flow charts are simplified. FIGS. 24, 25, 26a and 26b show another method of determining.

Figure 24:
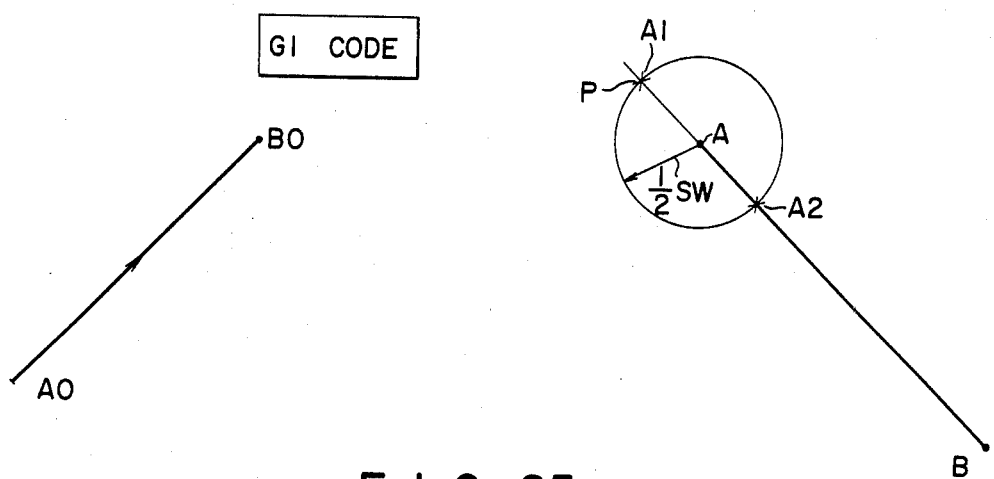
FIG. 24 is a diagram for explaining the flow chart shown in FIGS. 26a and 26b where the path A→B is a straight line.

FIG. 24 shows the relationship between point A and center P in a case wherein a groove is cut from point A0 to a point B0 and then a straight line cutting is made from point A to point B. Point P corresponds to one of the cross-points A1 and A2 between a straight line AB and a circle having its center at point A and a radius of $\tfrac{1}{2}$SW, that is a point corresponding to a vector $\overrightarrow{A \cdot A1}$ directed oppositely to vector $\overrightarrow{A \cdot B}$ when one considers vectors $\overrightarrow{A \cdot A1}$ and $\overrightarrow{A \cdot A2}$.

Figure 25:
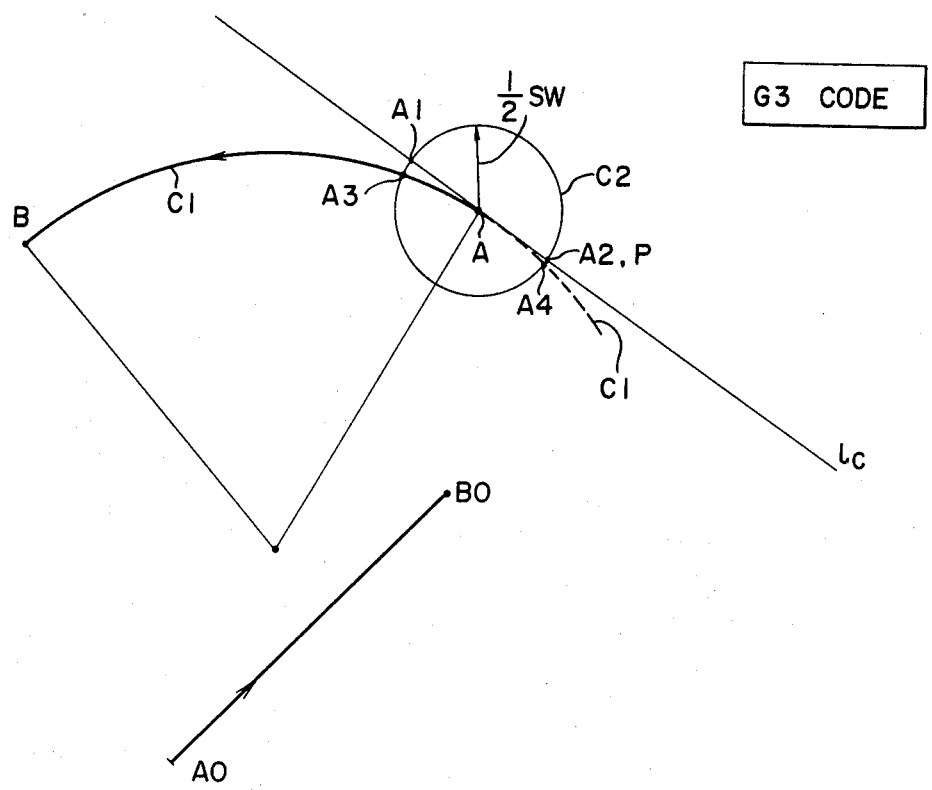
FIG. 25 is a diagram for explaining the flow chart shown in FIGS. 26a and 26b where the path A→B is a circular arc.

FIG. 25 shows a case wherein the path A→B is a portion of a circular arc (the case of G2 code is the same). By denoting the cross-points between a line lc and a circle C2 having its center at point A and a radius of $\tfrac{1}{2}$SW by A1 and A2, and by denoting cross-points between two circles C1 and C2 by A3 and A4, the point Q can be determined as follows.

(1) First, the number of pulses pA·B, pA·A3 and pA·A4 in a direction from point A to point B is determined. Since one of the points A3 and A4 (in this case A3) is always located on an arc A→B, pA·A3 < pA·A4. This descrimination gives point A3.

(2) Then the distances between points A1 and A3 and A2 and A3 are determined and a point (in this case point A2) corresponding to the larger one of the distances is determined as point P.

The procedures described above are shown by the flow charts shown in FIGS. 26a and 26b in which steps ST4 through ST19 show the steps of determining point P corresponding to the straight line A→B shown in FIG. 24 whereas steps ST20 through ST30 correspond to a circular arc. Steps ST5, ST6 and ST7 are provided for the purpose of using the flow charts in a case where the straight line A→B coincides with one of the coordinate axes X and Y.

Figure 2:
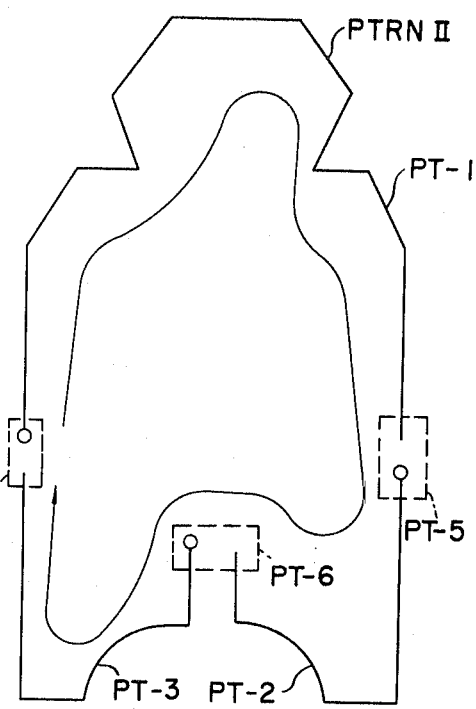
FIG. 2 is a plan view showing a groove shaped pattern of a die board for forming the punching die shown in FIG. 1.
Figure 3:
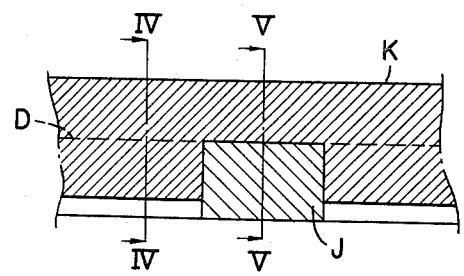
FIG. 3 is an enlarged sectional view of a section PT-5 shown in FIG. 2 cut in the direction of the groove.
Figure 4:
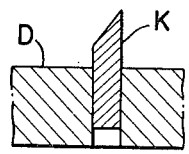
FIG. 4 is a cross-sectional view taken along a line IV—IV in FIG. 3.
Figure 5:
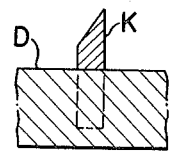
FIG. 5 is a cross-sectional view taken along a line V—V in FIG. 3.
Figure 6:
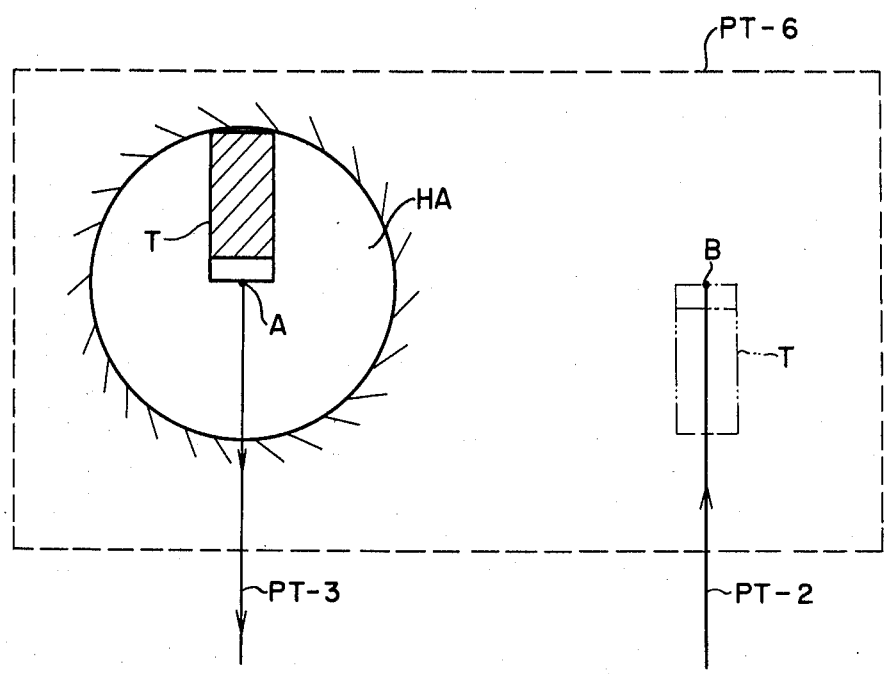
FIG. 6 is an enlarged view of a section PT-6 shown in FIG. 2.
Figure 7:
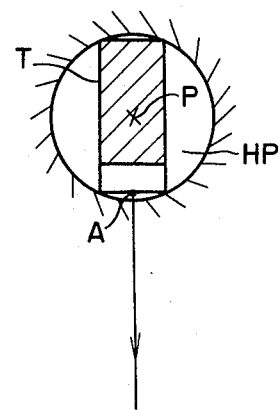
FIG. 7 is a sectional view showing the positional relationship between a cutting starting point A and a fret saw blade T on the die board which is useful to explain the principle of this invention.

FIG. 27 shows a groove working configuration of a package pattern (identical to that shown in FIG. 2). In FIG. 27, it is assumed that cutting of the groove is started from a point a (in this case the coordinates of point a are set as the program working origin (0-0) and then proceeds in the clockwise direction as shown by an arrow. At two intermediate point 1 and s the fret saw blade T is pulled above the die board, that is the workpiece by releasing the lower clamping member. The fret saw blade is again inserted into openings Hm and Ht which correspond to points m and t respectively. After the lower end of the fret saw blade has been clamped again by the lower clamping member, the cutting proceeds toward point n or point u. At a point y, cutting operation terminates. Near points b, c, d, e, f, g, h, i, j, k, n, p, q, r, u, v, w and x above mentioned switch-back operations and corner cutting operations are performed.

FIG. 28 shows a case wherein 6 package patterns each having a groove configuration as shown in FIG. 27 are cut in an arrangement as shown. Table 1 below shows an output format of the working program shown in FIG. 28. The contents of respective sequence numbers of this output format correspond to one block of the tape shown in FIG. 12.

TABLE 1

| OUTPUT FORMAT OF NC WORKING PROGRAM | | |
|---|---|---|
| No. 01 | T1 | |
| No. 02 | L3 | SW, ST |
| No. 03 | F4 | |
| No. 04 | L6 | |
| No. 05 | T4 | |
| No. 06 | M3 | |
| No. 07 | M4 | |
| No. 08 | G1 | XL1, YL1 |
| No. 09 | G4 | |
| No. 10 | G2 | XL2, YL2, I2, J2 |
| No. 11 | G1 | XL3, YL3 |
| No. 12 | G4 | |
| No. 13 | G2 | XL4, YL4, I4, J4 |
| No. 14 | G1 | XL5, YL5 |
| No. 15 | G4 | |
| No. 16 | G3 | XL6, YL6, I6, J6 |
| No. 17 | G1 | XL7, YL7 |
| No. 18 | G4 | |
| No. 19 | G2 | XL8, YL8, I8, J8 |
| No. 20 | G1 | XL9, YL9 |
| No. 21 | G4 | |
| No. 22 | G2 | XL10, YL10, I10, J10 |
| No. 23 | G1 | XL11, YL11 |
| No. 24 | G4 | |
| No. 25 | G2 | XL12, YL12, I12, J12 |
| No. 26 | G1 | XL13, YL13 |
| No. 27 | G4 | |
| No. 28 | G2 | XL14, YL14, I14, J14 |
| No. 29 | G1 | XL15, YL15 |
| No. 30 | G4 | |
| No. 31 | G3 | XL16, YL16, I16, J16 |
| No. 32 | G1 | XL17, YL17 |
| No. 33 | G4 | |
| No. 34 | G2 | XL18, YL18, I18, J18 |
| No. 35 | G1 | XL19, YL19 |
| No. 36 | G4 | |
| No. 37 | G2 | XL20, YL20, I20, J20 |
| No. 38 | G1 | XL21, YL21 |
| No. 39 | M5 | |
| No. 40 | M6 | |
| No. 41 | G0 | XL22, YL22 |
| No. 42 | T4 | |
| No. 43 | M3 | |
| No. 44 | M4 | |
| No. 45 | G1 | XL23, YL23 |
| No. 46 | G4 | |
| No. 47 | G2 | XL24, YL24, I24, J24 |
| No. 48 | G1 | XL25, YL25 |
| No. 49 | G4 | |
| No. 50 | G3 | XL26, YL26, I26, J26 |
| No. 51 | G1 | XL27, YL27 |
| No. 52 | G4 | |
| No. 53 | G2 | XL28, YL28, I28, J28 |
| No. 54 | G1 | XL29, YL29 |
| No. 55 | M5 | |
| No. 56 | M6 | |
| No. 57 | G0 | XL30, YL30 |
| No. 58 | T4 | |
| No. 59 | M3 | |
| No. 60 | M4 | |
| No. 61 | G1 | XL31, YL31 |
| No. 62 | G4 | |
| No. 63 | G2 | XL32, YL32, I32, J32 |
| No. 64 | G1 | XL33, YL33 |
| No. 65 | G3 | XL34, YL34, I34, J34 |
| No. 66 | G4 | |
| No. 67 | G2 | XL35, YL35, I35, J35 |
| No. 68 | G1 | XL36, YL36 |
| No. 69 | G4 | |
| No. 70 | G2 | XL37, YL37, I37, J37 |
| No. 71 | G1 | XL38, YL38 |
| No. 72 | M5 | |
| No. 73 | M6 | |
| No. 74 | M2 | |
| No. 75 | G7 | XL39, YL39, NX, NY |
| No. 76 | M0 | |

FIG. 29 is an enlarged view showing portions near points a, b, and c of the pattern shown in FIG. 27, and FIG. 30 is an enlarged view showing portions near points v, w and x of the pattern, these two figures being referred to in the following description. The content of the program shown in Table 1 will now be described. In a column to the right of a column showing sequence numbers are shown operation (OP) codes showing the contents of the instructions. Where the OP codes require data, such data are shown on the rightmost column. Thus, the numerical control device reads the working program according to the sequence number with the tape reader to give an instruction to the working machine to execute the content represented by the read out OP code thus cutting a groove or drilling an opening. More particularly, at the sequence No. 01, a tool, that is a fret saw blade T1 to be used is designated. At the sequence No. 02, the dimension of the fret saw blade T1 is designated. A symbol SW represents the tooth width, whereas ST the tooth thickness.

At No. 03, the groove cutting speed is given by F4, one of F codes. Although the F codes may designate different codes (for example F2) at respective blocks of the program, in this example, the cutting speeds of one pattern are all represented by a definite code F4. At No. 04, an OP code L6 termed a loop instruction is given for repeating the sequence between No. 04 and G7 code at No. 75. Thus, No. 05 through No. 75 constitute a working program corresponding to one package pattern (FIG. 27), and such working program is repeated 6 times according to an array shown in FIG. 28.

Sequence No. 05 represents an OP code T4 representing a drilling instruction utilized to drill an opening at a fret saw blade (T1) insertion position. Thus, opening Ha corresponding to the program working origin a(0-0) is formed according to this invention. The center of opening Ha is shifted toward -Y axis from the origin a. An OP code M3 at No. 06 is a fret saw blade clamping instruction for inserting the fret saw blade T1 into opening Ha to clamp the lower shank of the fret saw blade T1 by the lower clamping member. Then, at No. 07, an OP code M4 (fret saw blade drive instruction) is given to reciprocate the blade in the vertical direction.

Then, at No. 08, an OP code G1, or a movement instruction is given to move relatively the tip of the fret saw blade T1 from the origin a(0·0) to point b' a little before point b thus cutting a straight groove. Where the coordinates of point b' are given by (Xb'·Yb') the amounts of movements in the directions of X and Y axes are given by $$XL1 = Xb' - 0$$

$$YL1 = Yb' - 0.$$

Then, at No. 09, an OP code G4 is given which comprises a switch-back instruction which advances the fret saw blade T1 from point b' to point b by a switch-back amount ΔL and then retracts the fret saw blade T1 by the same amount thus executing a switch-back operation. It is assumed that the amount of switch-back ΔL is equal to ST. During this switch-back operation the orientation of the saw blade tip does not vary.

Then, at No. 10 an OP code G2 is generated for effecting a corner cutting between points b' and b". At this time, this OP code G2 is clockwise.

Data XL2, YL2, I2 and J2 are determined in the following manner:

$$YL2 = Xb'' - Xb', \ YL2 = Yb'' - Yb'$$

$$I2 = Xb' - X1, \ J2 = Yb' - y1$$

where (Xb"·Yb") and (Xb'·Yb') represent the coordinates of points b" and b' respectively, whereas (x1·y1) represents the coordinates of the center of a cornering circle.

At the sequence No. 11, the OP code G1 is given again. XL3 and YL3 show the amounts of movement of from point b" to point c' and these amounts are determined as follows.

$$XL3 = Xc' - Xb'', \ YL3 = Yc' - Yb''$$

Then at No. 12, the OP code G4 is given again so as to effect a switch-back operation at point c'.

After performing forward and rearward movements equal to the amount of switch-back at No. 13 an OP code G2 is given to effect a cornering cutting between points c' and c" wherein $$XL4 = Xc'' - Xc'; \ YL4 = Yc'' - Yc'$$

$$J4 = Xc' - x2; \ J4 = Yc' - y2.$$

The radii R of circles of the cornering cutting are the same. In this embodiment the radii R are related to the tooth width SW in a manner as shown in Table 2.

TABLE 2

| SW(mm) | R(mm) |
|---|---|
| –0.99 | 1.00 |
| 1.00–1.99 | 2.00 |
| 2.00– | 3.00 |

When instructions up to OP code G1 produced at sequence No. 38 have been executed, a groove up to point l would be cut. The OP code G3 is a circular arc cutting instruction identical to OP code G2 or a corner cutting instruction which rotates in the counter-clockwise direction. At No. 39 an OP code M5 is given to stop the vertical reciprocating motion of the fret saw blade T1. At No. 40, an OP code M6 is given to cause the lower clamping member to release the lower end of the fret saw blade T1 thus permitting its withdrawal from the die board.

When an OP code G0 is given at No. 41, the fret saw blade T1 which has been pulled upwardly is moved at a high speed to a point immediately above point m. Then, at No. 42 an OP code T4 is produced to form the opening Hm with a drill not shown. It should be noted that, at this time, the center of the drill (T4) that is the center of the opening Hm is offset from the point m. Such offset is necessary for making it possible to position the center of the tooth of the fret saw blade T1 inserted into the opening Hm at point m thus clamping the fret saw blade at that position.

At sequences No. 43 and No. 44, the insertion and the vertical reciprocating motion of the fret saw blade are instructed. Then at sequence No. 45 an instruction is issued to move the fret saw blade from point m to a point near point n, and at No. 46 a switch-back operation is instructed. At No. 47 an instruction is issued to form a cornering cutting of a radius R and then at No. 48 an OP code G1 is given to cut linearly up to a point near point p.

At No. 49, a switch-back instruction is given by OP code G4, and then at No. 50 an OP code G3 is given to cut a circular arc between points p and q in the counterclockwise direction. This arc is not equal to the circular arc having a radius of R and shown in FIG. 30 but is given by components XL28 and YL28 of the movement of from point p to point q and by the components I28 and J28 of the distance between the starting point p and the center of the arc.

Then, at No. 51 a linear movement instruction G1 is given to effect a linear cutting from point q to a point r' near point r. Then, at No. 52, an OP code G4 is issued to effect a switch-back cutting by an amount of ΔL and at No. 53 an instruction is given to effect a cornering cutting in the clockwise direction to reach a point r" beyond point r. By an OP code G1 issued at No. 54, a straight line cutting is made to point s. Then, at Nos. 55 and 56, instructions are issued to stop the vertically reciprocating motion of the fret saw blade T1 and to rlease the lower clamping member so that the fret saw blade is pulled up above the die board. Then, by an operation code G0 issued at No. 57, the fret saw blade is moved to point t.

Then, at No. 58 an OP code T4 is generated to form an instruction to drill opening Ht.

At No. 59 and No. 60 the fret saw blade T1 is inserted again through the drilled opening and the lower shank of the fret saw blade is clamped by the lower clamping member. Then the vertically reciprocating motion is started again by code M4. At No. 61, an OP code G1 is generated to linearly cut from point t to point u' near point u as shown in FIG. 30.

Then at No. 62, a switch-back cutting is performed by OP code G4. Then, by G2 code produced at No. 63 a cornering cutting is made from point u' to point u". At No. 64 a linear cutting is made from point u" to point v, followed by an arc cutting in the counterclockwise direction between points v and w'. At point w' a switch-back cutting is effected by OP code G4 produced at No. 66. By an operation code generated at No. 67 a cornering cutting is made between point w' and w" along a circle having a center at $(x_w \cdot y_w)$ and a radius R.

Then at No. 68, a linear cutting is made between point w" and point x' near point x. Switch-back cutting is made at No. 69 and then at No. 70 a corner cutting is made between points x' and x" along an arc having a smaller radius R'. Then at No. 71, an OP code G1 is generated to linearly cut between points x" and y. At No. 72 a code M5 is generated to stop the vertically reciprocating motion of the fret saw blade T1 and at No. 73 code M6 is generated to release the lower shank of the fret saw blade T1. Finally, at No. 74 an OP code M2 is generated to return the program to the start point a(0·0) at which the tip of the tooth of the fret saw blade T1 is situated just above point a. Then at No. 75 an OP code G7 is generated to form a loop instruction code which repeats operations between No. 64 and No. 75, the data XL39 and YL39 following OP G7 being also shown in FIG. 28.

The data NX and NY shown in FIG. 28 are Nx=3 and Ny=2 which show the number of package patterns arranged in the X and Y directions respectively.

The order of cuttings is A→B→C→D→E→F as shown in FIG. 28. Upon completion of the package pattern F, the fret saw blade T1 is returned to the origin a6 and then returned to the program working origin a1 by an instruction of OP code M0 generated at No. 76.

Although the output format shown in Table 1 has been described, this output format can be prepared from a simpler input format according to an input/output conversion program. One example thereof will be described with reference to a path between point a to c' shown in FIG. 29.

Assuming a TTY input

| *G1 | Xa·Ya | RETURN | |
|---|---|---|---|
| *G1 | Xb·Yb | " | input |
| *G0 | | " | format |
| *G1 | Xc·Yc | " | | where Xa, Ya, Xb, Yb, Xc, and Yc represent the values of absolute coordinates, then

| G1 | XL1·YL1 | (points a→b') |
|---|---|---|
| G4 | | (switch-back instruction) |
| G2 | XL2·YL2·I2·J2 | (points b'→b") |
| G1 | XL3·YL3 | (points b"→c') | where XL1−XL3 and YL1−YL3 represent incremental values. Thus, it is not necessary to individually calculate the coordinates of points b' and b" but these coordinate values can be provided by the conversion program.

The switch-back cutting operations and succeeding cornering cutting operations at respective points of inflections protect the fret saw blade from being damaged by forces acting upon the fret saw blade which are generated when the orientation of the fret saw blade is rapidly changed at each point of inflection, or by repeating bending forces.

Although the output format shown in Table 1 illustrates one example of a program wherein openings and groove sections following thereto are formed sequentially, in actual machining it is possible to firstly form openings at requisite portions and then cut grooves with the fret saw blade. As shown in FIGS. 29 and 30, the centers of openings Ha and Ht corresponding to respective cutting start points a and t are displaced from these points according to this invention.

In the system of determining the positions of openings according to this invention, the opening for receiving the fret saw blade and corresponding to the groove cutting start point is displaced from the cutting start position by a distance equal to one half of the tooth width SW in a direction opposite to the direction of cutting so that it is possible to reduce the diameter of the opening to a minimum required for forming a groove pattern utilized to form discontinuous grooves on a die board. For this reason, the openings do not decrease the mechanical strength of the die board.

According to this invention, as shown in the first embodiment shown in FIGS. 17, 18 and 19, the drilling position is calculated by using the angle $\theta$ utilized to adjust the orientation of the tooth of the fret saw blade at the start point A for cutting a path A→B so that, as shown in the flow chart, the data processing of a microcomputer system is not used exclusively for determining the position of the opening and the memory device can be used for other processings.

Figure 26A:
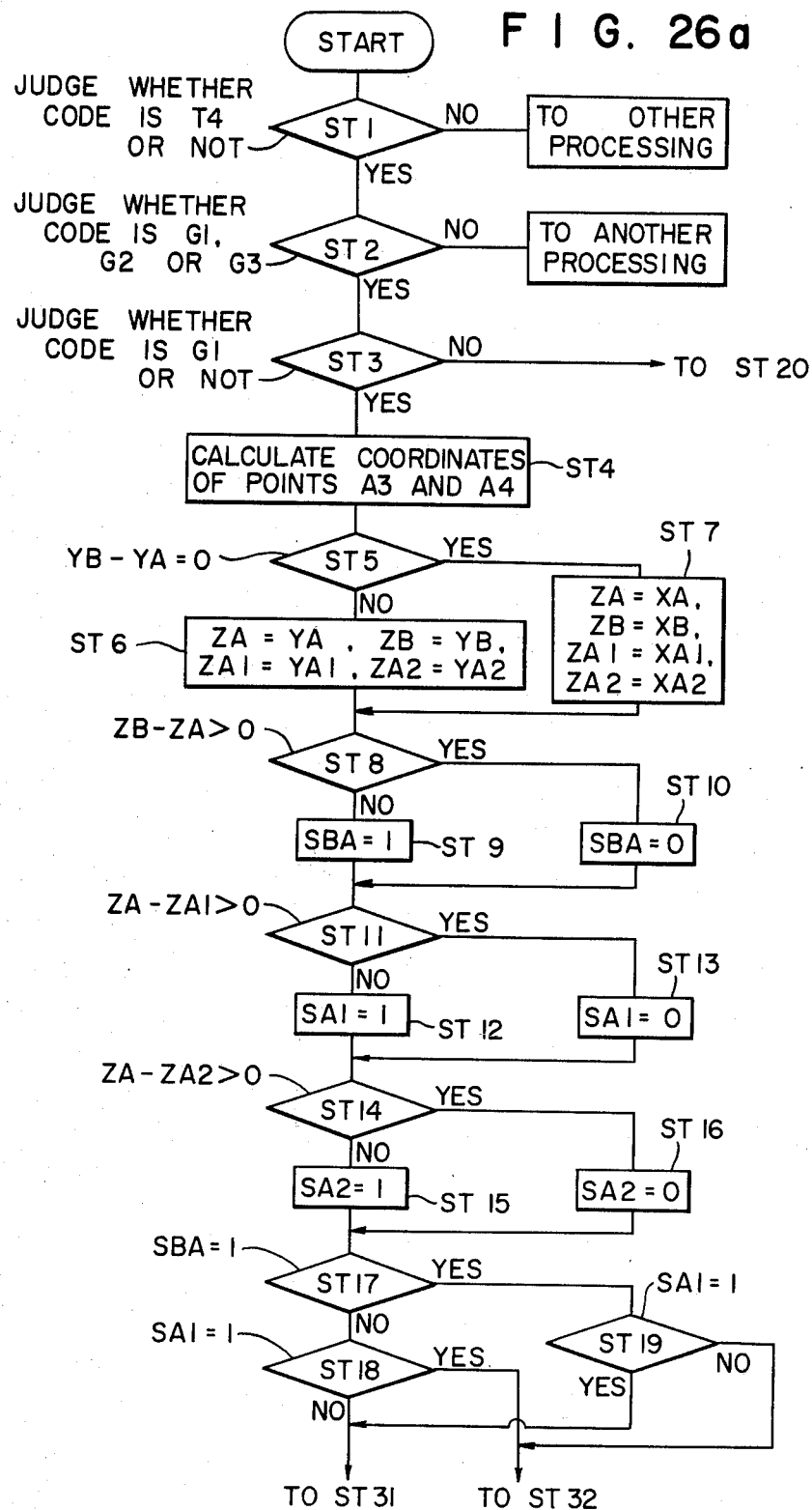

Further in the system shown in FIG. 23 and FIGS. 26a and 26b, angle $\theta$ is not utilized, but these two systems are equivalent and the opening position can be determined by an extremely simple processing step except the calculation step of square roots.

What is claimed is:

1. In a numerically controlled fret saw machine comprising:
   blank drive means for clamping a flat plate shaped blank to move the same to any position on a X-Y plane of rectangular coordinates;
   fret saw blade rotation means for controlling rotation of said fret saw blade such that a tip of said blade is normally oriented in directions of grooves cut through said blank by said fret saw blade;
   a tool disposed on said X-Y plane with a predetermined spacing between the tool and the fret saw blade for forming openings through said blank;
   drive means for driving said tool; and
   a digital control device for controlling the direction of movements of said blank in X and Y axes directions of rectangular coordinates and for controlling rotation of said fret saw blade, thereby forming with said tool openings adapted to receive said fret saw blade at points respectively corresponding to cutting start points of said grooves,
   a method of determining a position of each opening comprising the steps of:
   producing a movement instruction data regarding a cutting start point and a cutting end point of a portion of a groove to be cut, said points defining a path A→B;
   determining a point P having coordinates (XP·YP) and representing a center of said opening for receiving said fret saw blade, said point P being located on a straight line passing through a point A having coordinates (XA·YA) and a point B having coordinates (XB·YB) and said point P being spaced from said point A by one half of the width SW of said fret saw blade in a direction opposite to the direction of cutting of the groove starting from said point A when said section is straight, whereas when said section is a circular arc, said point P is selected to be a line which is tangent to said cirucular arc at said point A and spaced from said point A by one half of the width SW of said fret saw blade.

2. The method according to claim 1 wherein the coordinates of said points P are determined by the steps of:
   I. calculating orientation angle $\theta$ of said fret saw blade at time of starting cutting from said point A in accordance with a cutting instruction data regarding a path of from said point A to said point B and temporarily storing said orientation angle and II. calculating the coordinates (XP·YP) of said point P by using said orientation angle $\theta$ according to the following equations:

(A) where said path A→B is a straight line and where $|XBUF|\geqq|YBUF|$, $XP = XA + (SX) \cdot SW/2 \cdot \cos\theta$ $YP = YA + (SY) \cdot SW/2 \cdot \sin\theta$ whereas when $|XBUF|<|YBUF|$ $XP = XA + (SX) \cdot SW/2 \cdot \sin\theta$ $YP = YA + (SY) \cdot SW/2 \cdot \cos\theta$ (B) where said path A→B is a circular arc and where $|XBUF|\geqq|YBUF|$ $XP = XA + (SX) \cdot SW/2 \cdot \sin\theta$ $YP = YA + (SY) \cdot SW/2 \cdot \cos\theta$ whereas when $|XBUF<|YBUF|$
$XP = XA + (SX) \cdot SW/2 \cdot \cos\theta$ $YP = YA + (SY) \cdot SW/2 \cdot \sin\theta$ wherein $0 \leqq \theta \leqq \pi/4$
and XBUF and YBUF represent increments between point A(XA·YA) and point B(XB·YB) and expressed by equations XBUF=XB-XA and YBUF=YB-YA in the case of A, whereas in the case of B expressed by XBUF=i and YBUF=J where i and J represent coordinates of said point A from the center of said circular arc, and wherein (SX) and (SY) represent signs of X and Y components of a vector extending in a direction opposite to the orientation of said fret saw blade at said cutting starting point A and when said vector is in a first quadrant, expressed by $(SX) = +1, (SY) = +1$ in a second quadrant, expressed by $(SX) = -1, (SY) = +1$ in a third quadrant, expressed by $(SX) = -1, (SY) = -1$ and in a fourth quadrant expressed by $(SX) = +1, (SY) = -1.$ 3. The method according to claim 1 wherein when said path A→B is a straight line and cutting amounts of shifts XL' and YL' are calculated according to the following equations by using $XL' = -XL \cdot \dfrac{SW}{2\sqrt{XL^2 + YL^2}}$ $YL' = -YL \cdot \dfrac{SW}{2\sqrt{XL^2 + YL^2}}$ when a movement instruction from said point A to said point B is given by an output format of G1 XL·YL (where XL and YL represent increments).

4. The method according to claim 1 wherein when said path A→B is a circular arc, the position of said opening is determined by the steps of:

giving a movement information of from point A to point B as an output format

G2 XL·YL·i·J or

G3 XL·YL·i·J determining a quadrant in which said point A resides according to written values of i and J, judging whether said path A→B is clockwise (G2) or counterclockwise (G3) in accordance with given circular arc cutting instruction codes (G2 and G3), calculating a pair of values (SX) and (SY) determined by combining aforementioned formats, calculating amounts of shifts according to the following equations by using values of i, J, (SX) and (SY) and tooth width SW $XL' = (SX) \cdot |J| \cdot \dfrac{SW}{2\sqrt{i^2 + J^2}}$ $YL' = (SY) \cdot |i| \cdot \dfrac{SW}{2\sqrt{i^2 + J^2}}$ and calculating $XP = XA + XL'$ $YP = YA + YL'$ by using the values of XL' and YL' thus calculated.

5. The method according to claim 1 wherein when said path A→B is a straight line, the position of said opening is determined by the steps of:

(1) determining coordinate values (XA1·YA1) and (XA2·YA2) of cross-points A1 and A2 between a straight line passing through said points A and B and a circle about said point A and having a radius of $\frac{1}{2}$SW;

(2) judging YA1−YA2=0 regarding one coordinate axis, for example, axis Y;

(3) then, if YA1−YA2≠0 calculate the followings:

$d = YB - YA$ $d1 = YA - YA1$ $d2 = YA - YA2;$ (4) selecting one of d1 and d2 which has the same sign as d;

(5) setting $XP = XA1, YP = YA1$ if the result of step (4) is d1, whereas setting $XP = XA2, YP = YA2$ if the result is d2;

(6) determining $d = XB - XA$ $d1 = XA - XA1$ $d2 = XA - XA2$ if at step 2 $YA1-YA2=0$; and (7) then returning to step (4).

6. The method according to claim 1 wherein when the path A→B is a circular arc, the position of said opening is determined by the steps of:

(1) determining the coordinate values (XA1·YA1) and (XA2·YA2) of cross-points A1 and A2 between a tangent line to a circle C1 including an arc AB and passing through point A and a circle C2 about point A and having a radius ½SW;

(2) determining coordinate values (XA3·YA3) and (XA4·YA4) of cross-points between said circules C1 and C2;

(3) determining number of pulses pA·B necessary to rotate said fret saw blade from said point A to said point B in a direction represented by an instruction code G2 or G3;

(4) determining number of pulses pA·A3, and pA·A4 necessary for rotating said fret saw blade from said point A to points A3 and A4 respectively in the same direction as that of the rotation of from point A to point B;

(5) determining smaller one of said pA·A3 and pA·A4;

(6) if the result of step 5 is pA·A3, then determining distance l13 between points A1 and A3 and distance l23 between points A2 and A3;

(7) if the result of step 5 is pA·A4, then determining distance l14 between points A1 and A4 and distance l24 between points A2 and A4; and (8) if the result of step 6 or 7 is l13>l23 or l14>l24, then
setting $XP=XA1$ and $YP=YA1$ whereas if l13<l23 or l14<l24, then
setting $XP=XA2$ and $YP=YA2$.

* * * * *